United States Patent
Durham et al.

(10) Patent No.: US 11,403,005 B2
(45) Date of Patent: Aug. 2, 2022

(54) CRYPTOGRAPHIC MEMORY OWNERSHIP

(71) Applicant: Intel Corporation, Santa Clara, CA (US)

(72) Inventors: David M. Durham, Beaverton, OR (US); Ravi L. Sahita, Portland, OR (US); Vedvyas Shanbhogue, Austin, TX (US); Barry E. Huntley, Hillsboro, OR (US); Baiju Patel, Portland, OR (US); Gideon Gerzon, Zichron Yaakov (IL); Ioannis T. Schoinas, Portland, OR (US); Hormuzd M. Khosravi, Portland, OR (US); Siddhartha Chhabra, Portland, OR (US); Carlos V. Rozas, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 100 days.

(21) Appl. No.: 16/643,836

(22) PCT Filed: Sep. 29, 2017

(86) PCT No.: PCT/US2017/054383
§ 371 (c)(1),
(2) Date: Mar. 2, 2020

(87) PCT Pub. No.: WO2019/066918
PCT Pub. Date: Apr. 4, 2019

(65) Prior Publication Data
US 2021/0064254 A1    Mar. 4, 2021

(51) Int. Cl.
*G06F 3/06* (2006.01)
*G06F 9/455* (2018.01)
(Continued)

(52) U.S. Cl.
CPC ............ *G06F 3/0623* (2013.01); *G06F 3/064* (2013.01); *G06F 3/0679* (2013.01);
(Continued)

(58) Field of Classification Search
CPC ..... G06F 21/50–556; G06F 21/60–645; G06F 12/14–1491; H04L 9/0897; H04L 9/32–3257
See application file for complete search history.

(56) References Cited

U.S. PATENT DOCUMENTS

2014/0380009 A1    12/2014  LeMay et al.
2015/0095662 A1     4/2015  Jejurikar et al.
(Continued)

OTHER PUBLICATIONS

S. Jin, J. Ahn, J. Seol, S. Cha, J. Huh and S. Maeng, "H-SVM: Hardware-Assisted Secure Virtual Machines under a Vulnerable Hypervisor," in IEEE Transactions on Computers, vol. 64, No. 10, pp. 2833-2846, Oct. 1, 2015, doi: 10.1109/TC.2015.2389792. (Year: 2015).*

(Continued)

*Primary Examiner* — Madhuri R Herzog
(74) *Attorney, Agent, or Firm* — Alliance IP, LLC

(57) ABSTRACT

There is disclosed a microprocessor, including: a processing core; and a total memory encryption (TME) engine to provide TME for a first trust domain (TD), and further to: allocate a block of physical memory to the first TD and a first cryptographic key to the first TD; map within an extended page table (EPT) a host physical address (HPA) space to a guest physical address (GPA) space of the TD; create a memory ownership table (MOT) entry for a memory page within the block of physical memory, wherein the MOT table comprises a GPA reverse mapping; encrypt the MOT entry using the first cryptographic key; and append to the MOT entry verification data, wherein the MOT entry veri- (Continued)

fication data enables detection of an attack on the MOT entry.

25 Claims, 19 Drawing Sheets

(51) Int. Cl.
*H04L 9/08* (2006.01)
*G06F 12/14* (2006.01)
*G06F 21/62* (2013.01)
*H04L 9/32* (2006.01)
*G06F 21/60* (2013.01)
*G06F 21/64* (2013.01)

(52) U.S. Cl.
CPC ...... *G06F 9/45558* (2013.01); *G06F 12/1408* (2013.01); *G06F 21/60* (2013.01); *G06F 21/62* (2013.01); *G06F 21/64* (2013.01); *H04L 9/0897* (2013.01); *H04L 9/3247* (2013.01)

(56) References Cited

U.S. PATENT DOCUMENTS

| | | |
|---|---|---|
| 2016/0179696 A1 | 6/2016 | Zmudzinski |
| 2016/0246732 A1 | 8/2016 | Shanbhogue et al. |
| 2017/0091487 A1 | 3/2017 | LeMay |
| 2018/0129611 A1* | 5/2018 | Parker ................ G06F 12/1441 |
| 2018/0165224 A1* | 6/2018 | Brown .................... G06F 21/53 |

OTHER PUBLICATIONS

S. Jin and J. Huh, "Secure MMU: Architectural support for memory isolation among virtual machines," 2011 IEEE/IFIP 41st International Conference on Dependable Systems and Networks Workshops (DSN-W), 2011, pp. 217-222, doi: 10.1109/DSNW.2011.5958816. (Year: 2011).*

S. Jin, J. Ahn, S. Cha and J. Huh, "Architectural support for secure virtualization under a vulnerable hypervisor," 2011 44th Annual IEEE/ACM International Symposium on Microarchitecture (MICRO), 2011, pp. 272-283. (Year: 2011).*

PCT International Preliminary Reporton Patentability in PCT International Application Serial No. PCT/US2017/054383 dated Mar. 31, 2020 (8 pages).

PCT International Search Report and Written Opinion issued in PCT/US2017/054383, dated Jun. 21, 2018; 12 pages.

* cited by examiner

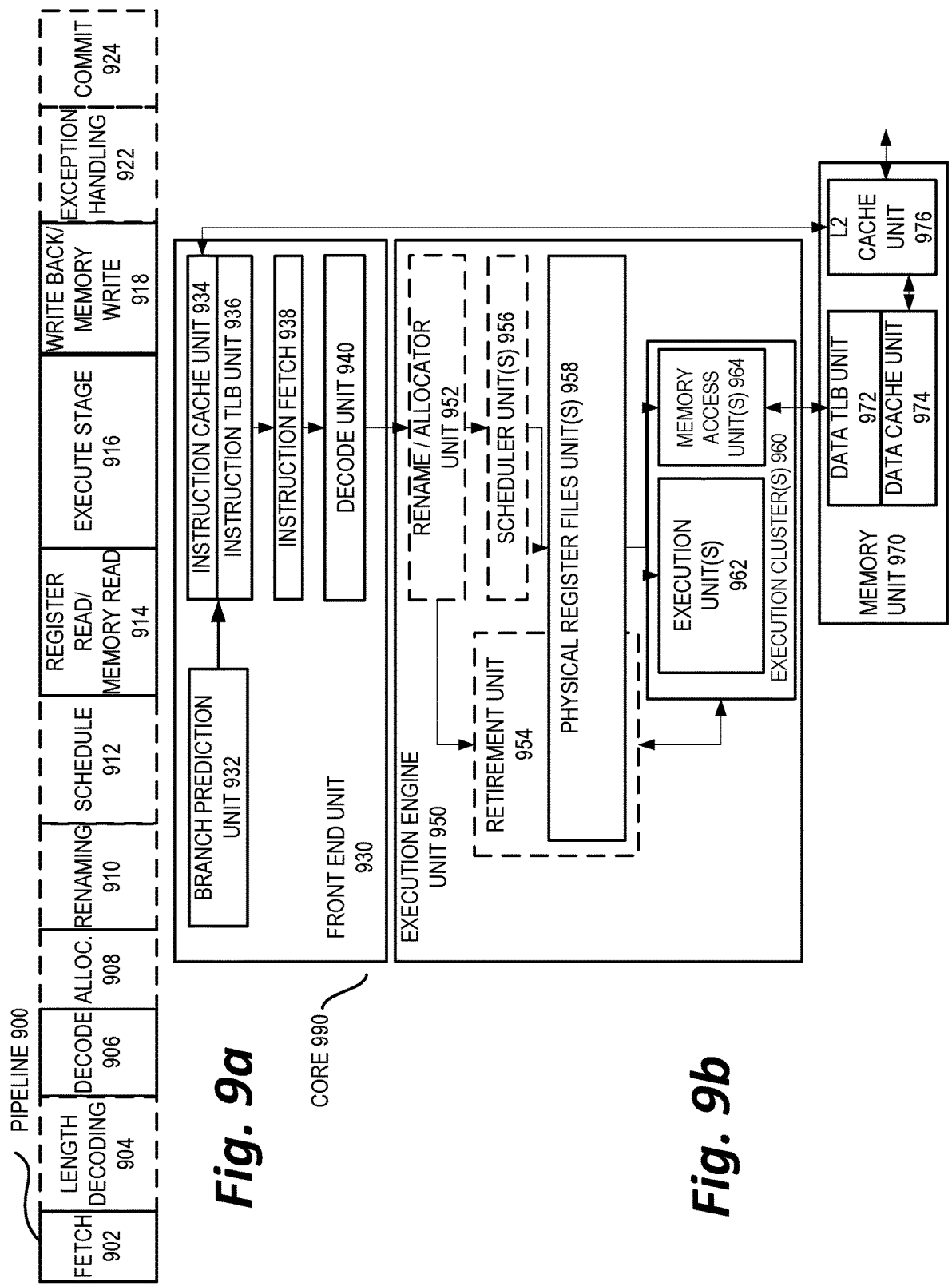

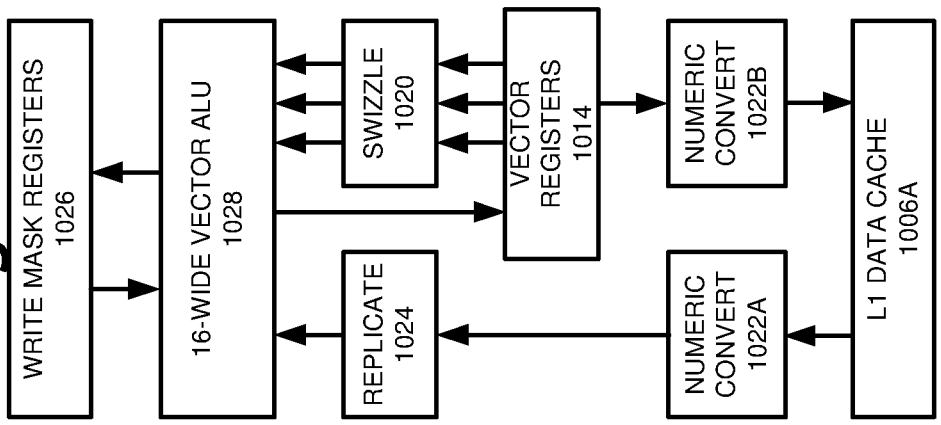
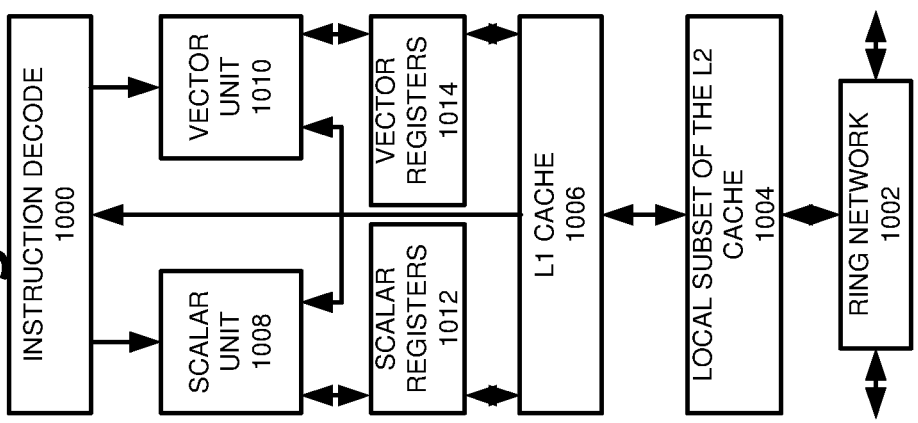

CRYPTOGRAPHIC MEMORY OWNERSHIP

CROSS-REFERENCE TO RELATED APPLICATIONS

This application is a national stage application under 35 U.S.C. § 371 of PCT International Application Serial No. PCT/US2017/054383, filed on Sep. 29, 2017, and entitled CRYPTOGRAPHIC MEMORY OWNERSHIP. The disclosure of the prior application is considered part of and is hereby incorporated by reference in its entirety in the disclosure of this application.

FIELD OF THE SPECIFICATION

This disclosure relates in general to the field of data center computing, and more particularly, though not exclusively, to a system and method for cryptographic memory ownership.

BACKGROUND

Multiprocessor systems are becoming more and more common. In the modern world, compute resources play an ever more integrated role with human lives. As computers become increasingly ubiquitous, controlling everything from power grids to large industrial machines to personal computers to light bulbs, the demand for ever more capable processors increases.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

FIG. 9a is a block diagram illustrating both an example in-order pipeline and an example register renaming an out-of-order issue/execution pipeline according to one or more examples of the present specification.

FIG. 9b is a block diagram illustrating both an example of an in-order architecture core and an example register renaming an out-of-order issue/execution architecture core to be included in a processor according to one or more examples of the present specification.

FIGS. 10a-10b illustrate a block diagram of a more specific in-order core architecture, which core would be one of several logic blocks (including other cores of the same type and/or different types) in a chip according to one or more examples of the present specification.

EMBODIMENTS OF THE DISCLOSURE

Figure 1:
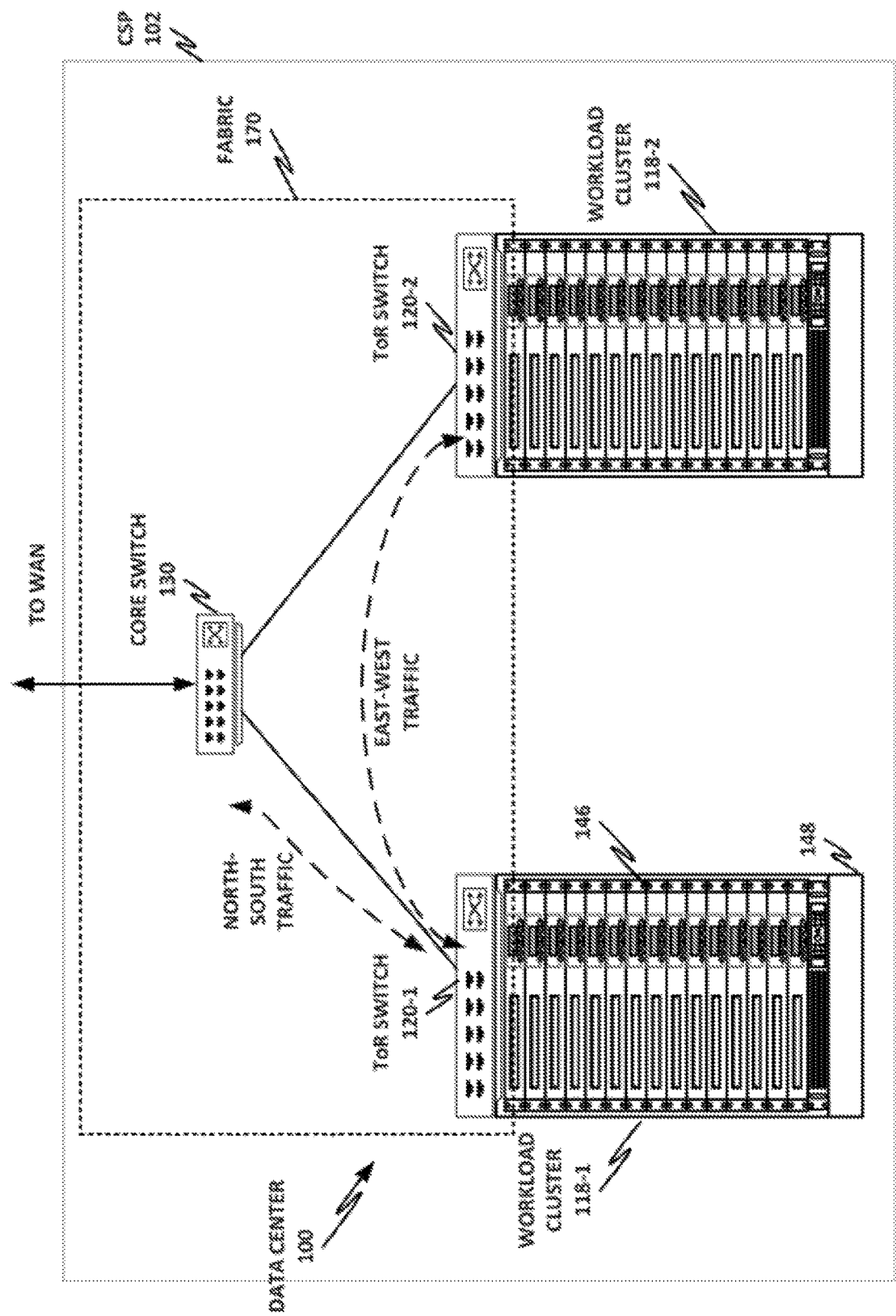
FIG. 1 is a block diagram of selected components of a data center with network connectivity, according to one or more examples of the present specification.

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

Many existing microprocessor architectures include special instructions for provisioning memory enclaves and setting up and utilizing trusted execution environments (TEEs). For example, Intel® software guard extension (SGX) instructions may be used to set up a memory enclave, such that only special SGX instructions may be used to enter, exit from, or manipulate memory within the enclave.

Existing TEEs such as SGX may provide a memory encryption engine (MEE), which encrypts memory, ensures memory integrity, and protects the memory from attacks such as replay attacks. Generally, the TEE is set up by provisioning a small region of memory as an enclave, and using the enclave for a portion of an application referred to as the trusted computing base (TCB).

In many cases, memory encrypted within a TEE is signed with an encryption key, which is used for encryption, decryption, and verification.

Embodiments of the present specification include features of an apparatus such as a microprocessor that is configured to provide not only small memory enclaves within an application, but an entire trust domain (TD), which may be (or include) a virtual machine (VM) that provides completely trusted execution. Similar to the Intel® SGX instructions, an example processor of the present specification may be provided with trust domain extension (TDX) instructions. The TDX instructions can be used to provision an isolated VM that can operate as a trust domain with protection not only from other VMs, but also from a virtual machine manager (VMM), hypervisor, or other management entity, which in the case of a trust domain acts as a blind hypervisor.

In the case of a standard untrusted VM, the VMM has complete access to the underlying operations of the VM. The VMM can inspect or change the state of the VM and its memory. However, in the case of a TD, the VMM is "blind" with respect to the inner workings of the VM. The VMM merely provisions the TD, allocates compute resources including memory to the TD, and provides host physical mapping (HPM) to guest physical mapping (GPM) of the memory locations. In other words, the VMM is aware of the mapping of guest physical addresses (or in other words virtualized physical addresses for the guest machine) to physical addresses within the physical memory of the host device. However, the TD maintains its own guest virtual mapping (GVM) to GPM tables. The VMM is not privy to GVM to GPM mapping. This reduces the ability of a compromised or malicious VMM to compromise the integrity of a TD. It also reduces the ability of a compromised or malicious VM or TD operating on the same VMM to affect the uncompromised TD.

Because the VMM lacks visibility into GVM-to-GPM mapping tables, the only remaining attack vector is the extended memory page containing the HPM to GPM mapping. This extended mapping can be protected with a memory ownership table (MOT).

In an example, the MOT is a microarchitectural structure that cannot be directly accessed by software. Architecturally, it holds security attributes for each 4 KB page of memory. Advantageously, the MOT includes in one example a 40-bit TD control structure (TDCS) pointer, and provides a reverse mapping for the GPM-to-HPM mapping. Thus, when the processor "walks" a memory page, the walk may include an integrity check in which it ensures that the mappings have not been tampered with. The CPU can use the MOT similarly to an MEE to ensure the integrity of memory and to protect against tampering and attacks such as replay attacks.

To ensure protection of the TD, the MOT itself is protected from tampering. In some cases, the MOT can be protected by placing it in a special memory area accessible only to the CPU or microarchitecture, such as dedicated microarchitecture memory or in a memory page protected by a physical memory range register (PMRR) that can be accessed only by the CPU. This ensures that it cannot be tampered with by software processes.

However, such specialized microarchitectural memory is relatively precious compared to the very large main memory in a modern computing system. It is therefore advantageous in some embodiments to move the MOT out of such specialized memory locations and into main memory.

To accomplish this while still maintaining the integrity of the MOT, a cryptographic MOT (CMOT) may be used. The CMOT may provided in a memory range that is protected by a PMRR, or may be provided in unprotected memory. For further security, each trust domain is provided with its own private key for encryption and signing. In a system where multiple tenants share a common hardware platform, each tenant may have its own trust domain in which one or more trusted virtual machines (TVMs) may be provisioned. Each entry in the CMOT may be encrypted using the corresponding private key of the associated TD, thereby ensuring that the owner of the key "owns" the corresponding physical memory page. The CMOT is managed by a multi-key total memory encryption (MKTME) engine, which is able to isolate tenants and VMs within a key domain, wherein the key domain includes at least one exclusive key for the tenant owning the TD. This cryptographically isolates the tenant's TD or key domain from other tenants and from the CSP itself. The CMOT may be used by the processor (for example, a page miss handler (PMH) that performs a page walk) to determine if a physical memory address and guest physical address memory mapping is assigned to the correct owning TD. Each entry in the table maps one physical page to one key, and is encrypted with the TD's private encryption key. Thus, the party owning the key domain can verify that the memory mapping is correct for its unique key, while encrypting the verified entries with the key.

The MKTME engine may utilize physical address bits to communicate which key is used to encrypt or decrypt a data line to or from physical memory. In one example, there is one key and key identifier (within the address) that is for exclusive use by the owning trust domain (i.e., the TD's private key). This is the key or key ID used to encrypt the individual CMOT entries associated with that TD.

On a memory write, the MKTME engine uses the private key of the TD to encrypt the written data, and on a memory read, the MKTME engine uses the private key to decrypt the data. A cache line belonging to the CMOT entry may thus be encrypted or decrypted as the CPU/PMH access is a CMOT mapping. If the integrity value for the entry is corrupted on a memory read by the PMH, the PMH rejects the mapping. The integrity value or field could be, for example, one or more bits that must be set to 0 to indicate successful mapping.

Thus, encrypting the entries with the key or key ID that they are associated with and verifying the integrity value permits the CMOT to reside in the more abundant main memory, while preventing a hardware attacker from replaying CMOT entries created for one TD into a different TD or untrusted VM, or the VMM itself. Furthermore, any attempt by a physical attacker to modify the ciphertext of the CMOT in memory results in memory corruption which can be detected in the processor, because the integrity value of the CMOT (i.e., an integrity field that contains a hash of the CMOT entry) will be corrupted.

Examples of the present specification provide a new TDX instruction such as "TDADDPAGE," which marks a free CMOT entry corresponding to an HPA as assigned exclusively to a TD specified by a TD identifier (TDID). The CPU writes the CMOT entry using the TD's exclusive private key ID in the address bits. This associates the CMOT entry with the TD's exclusive private key. Any other prior page state causes a fault. This instruction forces a cross-thread translation lookaside buffer (TLB) shootdown to ensure no other TD is caching a mapping to this physical page address (PPA). The instruction leaf can be invoked by VMM software. The instruction specifies the initial GPA that is mapped to the specified HPA. The CPU verifies that the GPA is mapped for the HPA by walking the extended page table (EPT) structure managed by the VMM.

As illustrated herein, the teachings of the present specification enable a large CMOT to be maintained in abundant main memory, while ensuring the integrity of each CMOT entry, and providing security for a plurality of TDs, each of which may have its own private key or keys, and may be protected from each other, from untrusted VMs, and from the VMM itself, ensuring that the CSP also cannot compromise the integrity of the TD and its virtual machines.

A system and method for cryptographic memory ownership will now be described with more particular reference to the attached FIGURES. It should be noted that throughout the FIGURES, certain reference numerals may be repeated to indicate that a particular device or block is wholly or substantially consistent across the FIGURES. This is not, however, intended to imply any particular relationship between the various embodiments disclosed. In certain examples, a genus of elements may be referred to by a particular reference numeral ("widget 10"), while individual species or examples of the genus may be referred to by a hyphenated numeral ("first specific widget 10-1" and "second specific widget 10-2").

FIG. 1 is a block diagram of selected components of a data center with connectivity to network 100 of a cloud service provider (CSP) 102, according to one or more examples of the present specification. CSP 102 may be, by way of nonlimiting example, a traditional enterprise data center, an enterprise "private cloud," or a "public cloud," providing services such as infrastructure as a service (IaaS), platform as a service (PaaS), or software as a service (SaaS).

CSP 102 may provision some number of workload clusters 118, which may be clusters of individual servers, blade servers, rackmount servers, or any other suitable server topology. In this illustrative example, two workload clusters, 118-1 and 118-2 are shown, each providing rackmount servers 146 in a chassis 148.

In this illustration, workload clusters 118 are shown as modular workload clusters conforming to the rack unit ("U") standard, in which a standard rack, 19 inches wide, may be built to accommodate 42 units (42U), each 1.75 inches high and approximately 36 inches deep. In this case, compute resources such as processors, memory, storage, accelerators, and switches may fit into some multiple of rack units from one to 42.

Each server 146 may host a standalone operating system and provide a server function, or servers may be virtualized, in which case they may be under the control of a virtual machine manager (VMM), hypervisor, and/or orchestrator, and may host one or more virtual machines, virtual servers, or virtual appliances. These server racks may be collocated in a single data center, or may be located in different geographic data centers. Depending on the contractual agreements, some servers 146 may be specifically dedicated to certain enterprise clients or tenants, while others may be shared.

The various devices in a data center may be connected to each other via a switching fabric 170, which may include one or more high speed routing and/or switching devices. Switching fabric 170 may provide both "north-south" traffic (e.g., traffic to and from the wide area network (WAN), such as the internet), and "east-west" traffic (e.g., traffic across the data center). Historically, north-south traffic accounted for the bulk of network traffic, but as web services become more complex and distributed, the volume of east-west traffic has risen. In many data centers, east-west traffic now accounts for the majority of traffic.

Furthermore, as the capability of each server 146 increases, traffic volume may further increase. For example, each server 146 may provide multiple processor slots, with each slot accommodating a processor having four to eight cores, along with sufficient memory for the cores. Thus, each server may host a number of VMs, each generating its own traffic.

To accommodate the large volume of traffic in a data center, a highly capable switching fabric 170 may be provided. Switching fabric 170 is illustrated in this example as a "flat" network, wherein each server 146 may have a direct connection to a top-of-rack (ToR) switch 120 (e.g., a "star" configuration), and each ToR switch 120 may couple to a core switch 130. This two-tier flat network architecture is shown only as an illustrative example. In other examples, other architectures may be used, such as three-tier star or leaf-spine (also called "fat tree" topologies) based on the "Clos" architecture, hub-and-spoke topologies, mesh topologies, ring topologies, or 3-D mesh topologies, by way of nonlimiting example.

The fabric itself may be provided by any suitable interconnect. For example, each server 146 may include an Intel® Host Fabric Interface (HFI), a network interface card (NIC), or other host interface. The host interface itself may couple to one or more processors via an interconnect or bus, such as PCI, PCIe, or similar, and in some cases, this interconnect bus may be considered to be part of fabric 170.

The interconnect technology may be provided by a single interconnect or a hybrid interconnect, such as where PCIe provides on-chip communication, 1 Gb or 10 Gb copper Ethernet provides relatively short connections to a ToR switch 120, and optical cabling provides relatively longer connections to core switch 130. Interconnect technologies include, by way of nonlimiting example, Intel® Omni-Path™, TrueScale™, Ultra Path Interconnect (UPI) (formerly called QPI or KTI), FibreChannel, Ethernet, FibreChannel over Ethernet (FCoE), InfiniBand, PCI, PCIe, or fiber optics, to name just a few. Some of these will be more suitable for certain deployments or functions than others, and selecting an appropriate fabric for the instant application is an exercise of ordinary skill.

Note however that while high-end fabrics such as Omni-Path™ are provided herein by way of illustration, more generally, fabric 170 may be any suitable interconnect or bus for the particular application. This could, in some cases, include legacy interconnects like local area networks (LANs), token ring networks, synchronous optical networks (SONET), asynchronous transfer mode (ATM) networks, wireless networks such as WiFi and Bluetooth, "plain old telephone system" (POTS) interconnects, or similar. It is also expressly anticipated that in the future, new network technologies will arise to supplement or replace some of those listed here, and any such future network topologies and technologies can be or form a part of fabric 170.

In certain embodiments, fabric 170 may provide communication services on various "layers," as originally outlined in the OSI seven-layer network model. In contemporary practice, the OSI model is not followed strictly. In general terms, layers 1 and 2 are often called the "Ethernet" layer (though in large data centers, Ethernet has often been supplanted by newer technologies). Layers 3 and 4 are often referred to as the transmission control protocol/internet protocol (TCP/IP) layer (which may be further subdivided into TCP and IP layers). Layers 5-7 may be referred to as the "application layer." These layer definitions are disclosed as a useful framework, but are intended to be nonlimiting.

Figure 2:
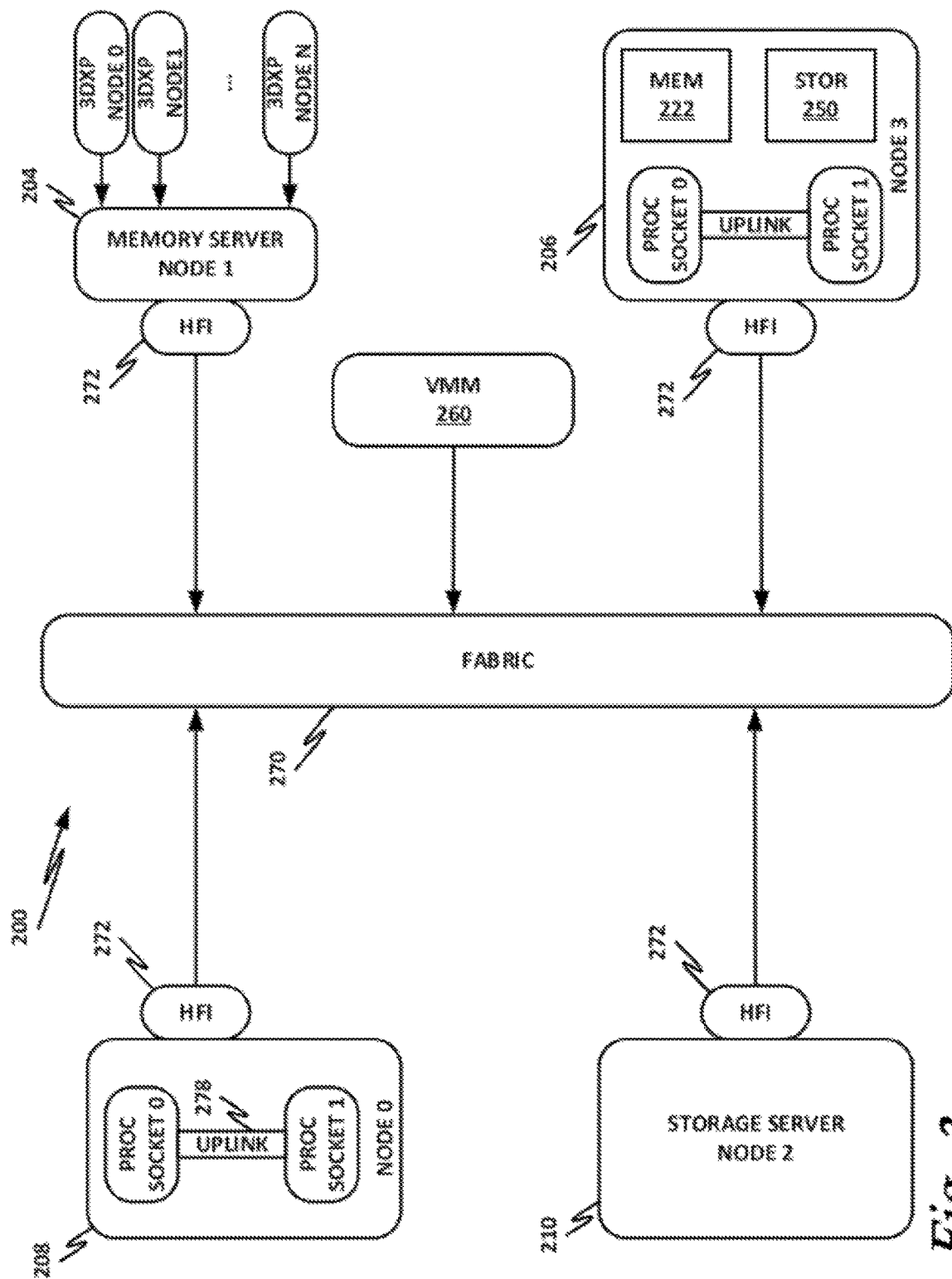
FIG. 2 is a block diagram of selected components of an end-user computing device, according to one or more examples of the present specification.

FIG. 2 is a block diagram of a data center 200 according to one or more examples of the present specification. Data center 200 may be, in various embodiments, the same as network 100 of FIG. 1, or may be a different data center. Additional views are provided in FIG. 2 to illustrate different aspects of data center 200.

In this example, a fabric 270 is provided to interconnect various aspects of data center 200, including VMM 260. VMM 260 may be a virtual machine manager, a hypervisor, a domain 0, or other management entity for virtual machines. Fabric 270 may be the same as fabric 170 of FIG. 1, or may be a different fabric. As above, fabric 270 may be provided by any suitable interconnect technology. In this example, Intel® Omni-Path™ is used as an illustrative and nonlimiting example.

As illustrated, data center 200 includes a number of logic elements forming a plurality of nodes. It should be understood that each node may be provided by a physical server, a group of servers, or other hardware. Each server may be running one or more virtual machines as appropriate to its application.

Node 0 208 is a processing node including a processor socket 0 and processor socket 1. The processors may be, for example, Intel® Xeon™ processors with a plurality of cores, such as 4 or 8 cores. Node 0 208 may be configured to provide network or workload functions, such as by hosting a plurality of virtual machines or virtual appliances.

Onboard communication between processor socket 0 and processor socket 1 may be provided by an onboard uplink 278. This may provide a very high speed, short-length interconnect between the two processor sockets, so that virtual machines running on node 0 208 can communicate with one another at very high speeds. To facilitate this communication, a virtual switch (vSwitch) may be provisioned on node 0 208, which may be considered to be part of fabric 270.

Node 0 208 connects to fabric 270 via an HFI 272. HFI 272 may connect to an Intel® Omni-Path™ fabric. In some examples, communication with fabric 270 may be tunneled, such as by providing UPI tunneling over Omni-Path™.

Because data center 200 may provide many functions in a distributed fashion that in previous generations were provided onboard, a highly capable HFI 272 may be provided. HFI 272 may operate at speeds of multiple gigabits per second, and in some cases may be tightly coupled with node 0 208. For example, in some embodiments, the logic for HFI 272 is integrated directly with the processors on a system-on-a-chip. This provides very high speed communication between HFI 272 and the processor sockets, without the need for intermediary bus devices, which may introduce additional latency into the fabric. However, this is not to imply that embodiments where HFI 272 is provided over a traditional bus are to be excluded. Rather, it is expressly anticipated that in some examples, HFI 272 may be provided on a bus, such as a PCIe bus, which is a serialized version of PCI that provides higher speeds than traditional PCI. Throughout data center 200, various nodes may provide different types of HFIs 272, such as onboard HFIs and plug-in HFIs. It should also be noted that certain blocks in a system on a chip may be provided as intellectual property (IP) blocks that can be "dropped" into an integrated circuit as a modular unit. Thus, HFI 272 may in some cases be derived from such an IP block.

Note that in "the network is the device" fashion, node 0 208 may provide limited or no onboard memory or storage. Rather, node 0 208 may rely primarily on distributed services, such as a memory server and a networked storage server. Onboard, node 0 208 may provide only sufficient memory and storage to bootstrap the device and get it communicating with fabric 270. This kind of distributed architecture is possible because of the very high speeds of contemporary data centers, and may be advantageous because there is no need to over-provision resources for each node. Rather, a large pool of high-speed or specialized memory may be dynamically provisioned between a number of nodes, so that each node has access to a large pool of resources, but those resources do not sit idle when that particular node does not need them.

In this example, a node 1 memory server 204 and a node 2 storage server 210 provide the operational memory and storage capabilities of node 0 208. For example, memory server node 1 204 may provide remote direct memory access (RDMA), whereby node 0 208 may access memory resources on node 1 204 via fabric 270 in a DMA fashion, similar to how it would access its own onboard memory. The memory provided by memory server 204 may be traditional memory, such as double data rate type 3 (DDR3) dynamic random access memory (DRAM), which is volatile, or may be a more exotic type of memory, such as a persistent fast memory (PFM) like Intel® 3D Crosspoint™ (3DXP), which operates at DRAM-like speeds, but is nonvolatile.

Similarly, rather than providing an onboard hard disk for node 0 208, a storage server node 2 210 may be provided. Storage server 210 may provide a networked bunch of disks (NBOD), PFM, redundant array of independent disks (RAID), redundant array of independent nodes (RAIN), network attached storage (NAS), optical storage, tape drives, or other nonvolatile memory solutions.

Thus, in performing its designated function, node 0 208 may access memory from memory server 204 and store results on storage provided by storage server 210. Each of these devices couples to fabric 270 via a HFI 272, which provides fast communication that makes these technologies possible.

By way of further illustration, node 3 206 is also depicted. Node 3 206 also includes a HFI 272, along with two processor sockets internally connected by an uplink. However, unlike node 0 208, node 3 206 includes its own onboard memory 222 and storage 250. Thus, node 3 206 may be configured to perform its functions primarily onboard, and may not be required to rely upon memory server 204 and storage server 210. However, in appropriate circumstances, node 3 206 may supplement its own onboard memory 222 and storage 250 with distributed resources similar to node 0 208.

The basic building block of the various components disclosed herein may be referred to as "logic elements." Logic elements may include hardware (including, for example, a software-programmable processor, an ASIC, or an FPGA), external hardware (digital, analog, or mixed-signal), software, reciprocating software, services, drivers, interfaces, components, modules, algorithms, sensors, components, firmware, microcode, programmable logic, or objects that can coordinate to achieve a logical operation. Furthermore, some logic elements are provided by a tangible, non-transitory computer-readable medium having stored thereon executable instructions for instructing a processor to perform a certain task. Such a non-transitory medium could include, for example, a hard disk, solid state memory or disk, read-only memory (ROM), persistent fast memory (PFM) (e.g., Intel® 3D Crosspoint™), external storage, redundant array of independent disks (RAID), redundant array of independent nodes (RAIN), network-attached storage (NAS), optical storage, tape drive, backup system, cloud storage, or any combination of the foregoing by way of nonlimiting example. Such a medium could also include instructions programmed into an FPGA, or encoded in hardware on an ASIC or processor.

Figure 3:
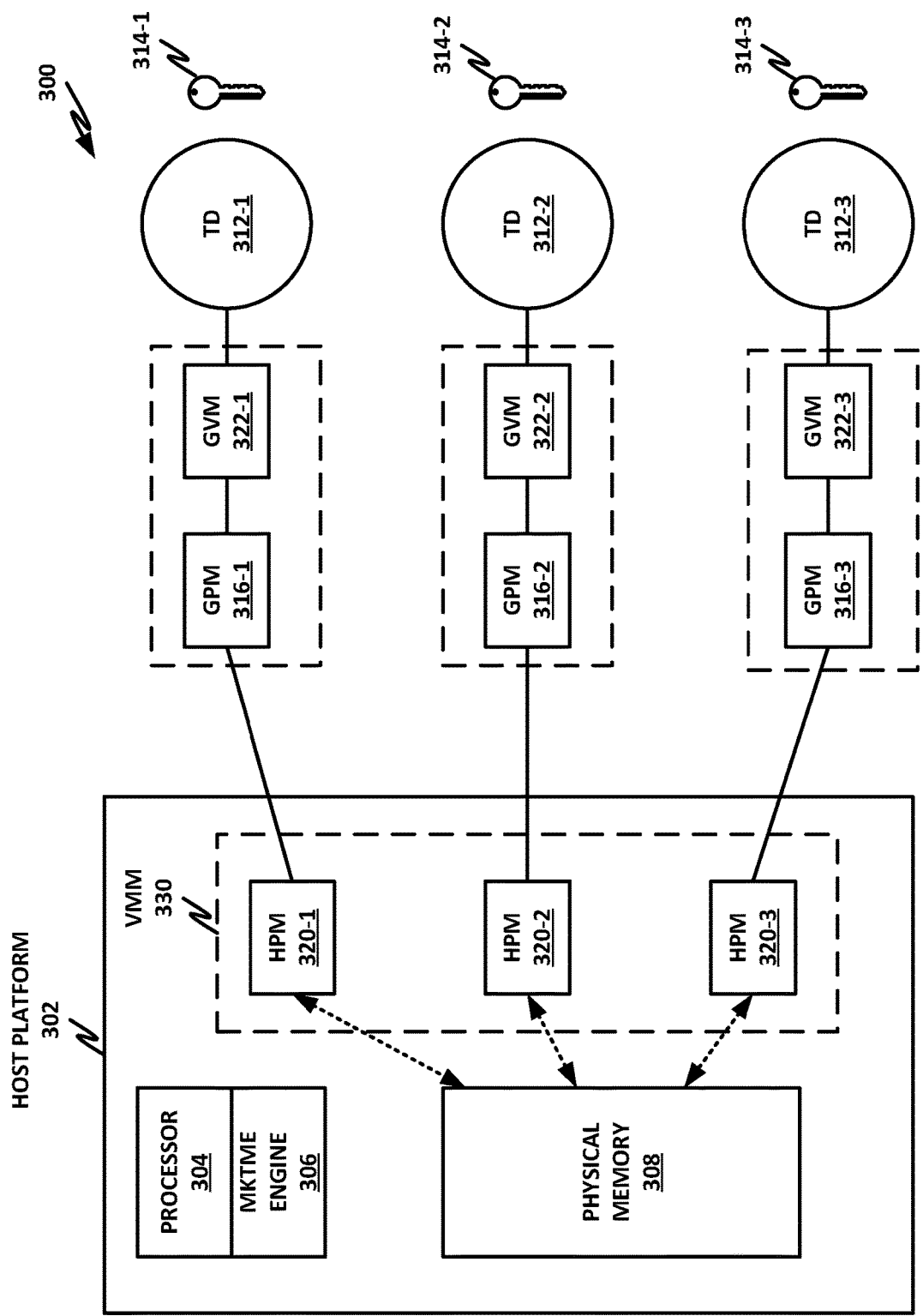
FIG. 3 is a block diagram of a computing system, according to one or more examples of the present specification.

FIG. 3 is a block diagram of a computing system 300 according to one or more examples of the present specification. In this example, computing system 300 is configured to provide one or more trust domains on a host platform 302. As described above, each trust domain 312 may have its own private key 314. Each private key 314 may be used to sign, encrypt, and decrypt any memory pages "owned" by the TD.

In this example, host platform 302 includes one or more processors 304, which include a multi-key total memory encryption (MKTME) engine 306. As described in this specification, MKTME engine 306 is configured to provide encrypted memory pages that are owned by the respective TDs 312, and that are not visible to a VMM 330 that manages the virtual machines.

MKTME engine 306 may be provided in various embodiments in hardware, such as in instructions encoded directly in silicon, or in microcode. In other embodiments, MKTME engine 306 could also be provided within a read-only memory, a flash memory, or software running in a protected memory region, such as in a trusted execution environment (TEE).

Host platform 302 also includes physical memory 308, which can be partitioned among the various virtual machines. Thus, VMM 330 provisions a trust domain 312 with its own private key 314, and assigns one or more memory pages (i.e. 4 KB memory pages) to that TD 312. VMM 330 includes an extended memory map which includes host physical mappings 320 that map host physical addresses to guest physical addresses for each TD 312.

For example, TD 312-1 has private key 314-1, TD 312-2 has private key 314-2, and TD 312-3 has private key 314-3. When VMM 330 provisions these TDs 312, it provides an HPM to GPM matching for each. For example, HPM 320-1 maps to GPM 316-1. GPM 316-1 includes a block of memory that is owned by TD 312-1. Similarly, HPM 320-2 maps to GPM 316-2, with HPM 320-2 mapping a block of memory owned by TD 312-2.

HPM 320-3 maps to GPM 316-2. HPM 320-3 is a map of one or more memory pages owned by TD 312-3.

In this example, each TD 312 may provision one or more virtual machines that reside within the memory owned by the TD. Each TD also includes its own guest physical memory to guest virtual memory mapping. For example, TD 312-1 includes GPM 316-1 mapped to GVM 322-1. TD 312-2 includes a mapping of GPM 316-2 to GVM 322-2. TD 312-3 includes GPM 316-3 mapped to GVM 322-3.

As is seen here, the guest memory mapping tables are all independent of each other, and are not visible to VMM 330. Thus, VMM 330 cannot view or interfere with the state of any TD 312. Furthermore, a compromised or malicious TD, or a non-trusted VM on host platform 302 cannot view or interfere with any TD 312.

Thus, the only vector of attack that is available for a compromised host is to attack the extended memory mapping on VMM 330.

As described above, in certain prior implementations, the extended memory table that maps an HPM 320 to a GPM 316 was protected by placing it in a special memory location dedicated to microarchitecture.

However, embodiments of MKTME engine 306 of the present specification are configured to provide a CMOT that can be safely placed in main memory and still maintain the integrity of TDs 312. This can be accomplished by placing the extended memory table into a memory region that is controlled by the CPU via a PMRR, so that software processes do not have access to that memory range. To further protect the CMOT, the CMOT is a microarchitectural structure that cannot be directly accessed by software. Furthermore, the CMOT includes security attributes, such as A TDCS pointer that provides a reverse mapping of GPM 316 to HPM mapping. Thus, MKTME engine 306, when walking a memory page, can check the TDCS pointer and ensure that the mapping has remained consistent.

To further ensure that the CMOT is not compromised, an integrity field may be provided, which may include a cryptographic hash of the entry, which is signed by the respective private key 314 of the owning TD. Thus, MKTME engine 306 can be confident that the memory page has not been tampered with, because if it is, the cryptographic hash will no longer be valid.

An example of a CMOT is provided below. This example should be understood to be a nonlimiting and illustrative example, and it should be understood that embodiments of the teachings of the present specification may craft different forms of CMOTs that still achieve the teachings of this specification.

| Field | Size_(bits) | Description |
| --- | --- | --- |
| Page_Free | 1 | Whether the HPA slot is valid or not |
| Page_Assigned | 1 | 1 = not assigned to any TD, accessible by CSP SW; 0 = TD page (may not be assigned) |
| Page_Blocked | 1 | 1 = assigned to TD (specified by TD_ID); 0 = not assigned to any TD (transient) |
| TDCS pointer | 1 | Page Blocked-place holder for memory management |
| Page_Type | 40 | 40 bits of the 4 KB page frame used for the TD Control Structure |
| GPA | 3 | Indicates sw access restricted TD page types such as TDCS, TDTCS . . . |
| Valid | 40 | 4 KB Guest Physical Address expected to reference |

Figure 4:
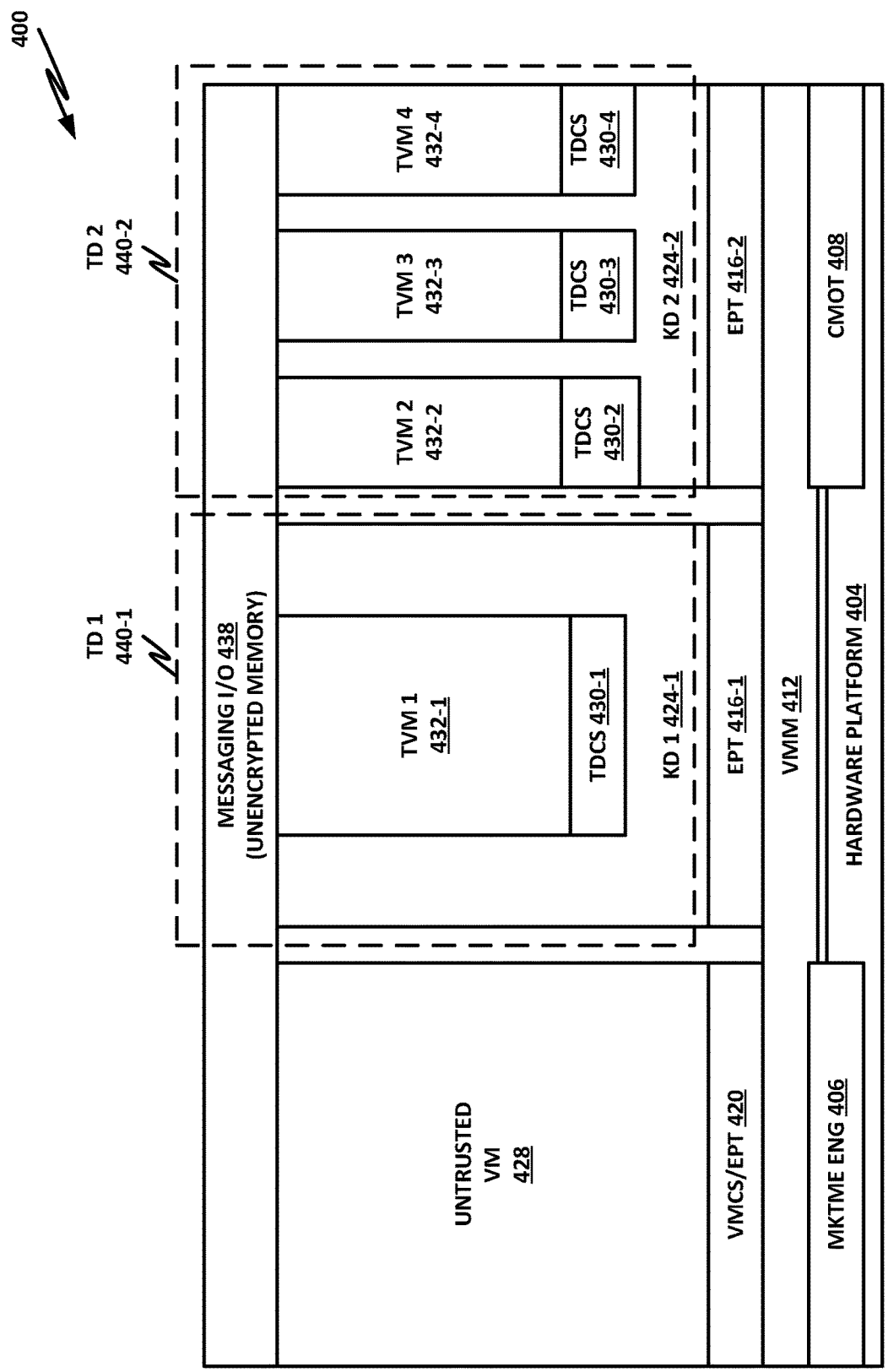
FIG. 4 is a block diagram of a computing system that illustrates additional aspects of the teachings of the present specification.

FIG. 4 is a block diagram of a computing system 400 that illustrates additional aspects of the teachings of the present specification.

In this example, a hardware platform 404 includes a CMOT 408 and an MKTME engine 406. Hardware platform 404 provides a VMM 412 which is configured to provide one or more trust domains 440.

When VMM 412 provisions virtual machines or trusted domains, it establishes an extended page table 416 for each. In the case of an untrusted VM such as untrusted VM 428, in addition to or instead of an EPT 420, VMM 412 may provision a virtual machine control structure (VMCS).

When VMM 412 provisions untrusted VM 428, it has visibility not only into the EPT for the untrusted VM, but also into the untrusted VM's internal memory mappings. This includes GPM to GVM mappings. This gives VMM 412 complete visibility into and control over untrusted VM 428. In the case of untrusted VM 428, VMM 412 provisions a VMCS and EPT 420 for untrusted VM 428. EPT 420 includes the HPM to GPM mapping, while VMCS may include the GPM to GVM mapping. While this is suitable for many computing tasks, there are some tasks that require the establishment of a trust domain so that the operations of the VMM can be kept private and protected from other VMs, and from the VMM itself. This ensures that the CSP cannot tamper with the trusted VM, and that it cannot access privileged information. Thus, in this example, VMM 412 provisions to trust domains, namely TD 1 440-1 and TD 2 440-2. VMM 412 establishes an EPT 416-1 for TD 1 440-1, and an EPT 416-2 for TD 2 440-2. VMM 412 necessarily has visibility into and control over EPT 416. However, to ensure that a malicious VM or a compromised VMM does not tamper with an EPT 416, CMOT 408 is provided within memory of hardware platform 404, and may include useful fields such as a TDCS pointer and an integrity field to ensure that EPT 416 has not been modified.

Each TD 440 includes its own key domain 424. For example, TD 1 440-1 includes KD 1 424-1, while TD 2 440-2 includes KD 2 424-2.

Each TD 440 may provision one or more trusted VMs (TVMs) 432. For each TVM 432, the TD 440 may also provision a trusted domain control structure (TDCS) 430 which provides the GPM to GVM mapping for the TVM 432.

Thus, within TD 1 440-1, TVM 1 432-1 is provisioned with TDCS 430-1.

Within TD 2 440-2, TVM 2 432-2, TVM 3 432-3, and TVM 4 432-4 are provisioned. The TD may provision for each TVM 432 a respective TDCS 430. For example, TDCS 430-2 is provisioned for TVM 2 432-2. TDCS 430-3 is provisioned for TVM 3 432-3. TDCS 430-4 is provisioned for TVM 4 432-4.

As is illustrated in this figure, each TD 440 maintains its own separate KD 424, which includes one or more private keys that the TD 440 can use to encrypt, decrypt, and sign memory that the TD owns. As illustrated above, MKTME engine 406 employs CMOT 408 to ensure that EPTs 416 are not compromised, or tampered with. It also prevents attacks such as replay attacks, and other interference.

Figure 5:
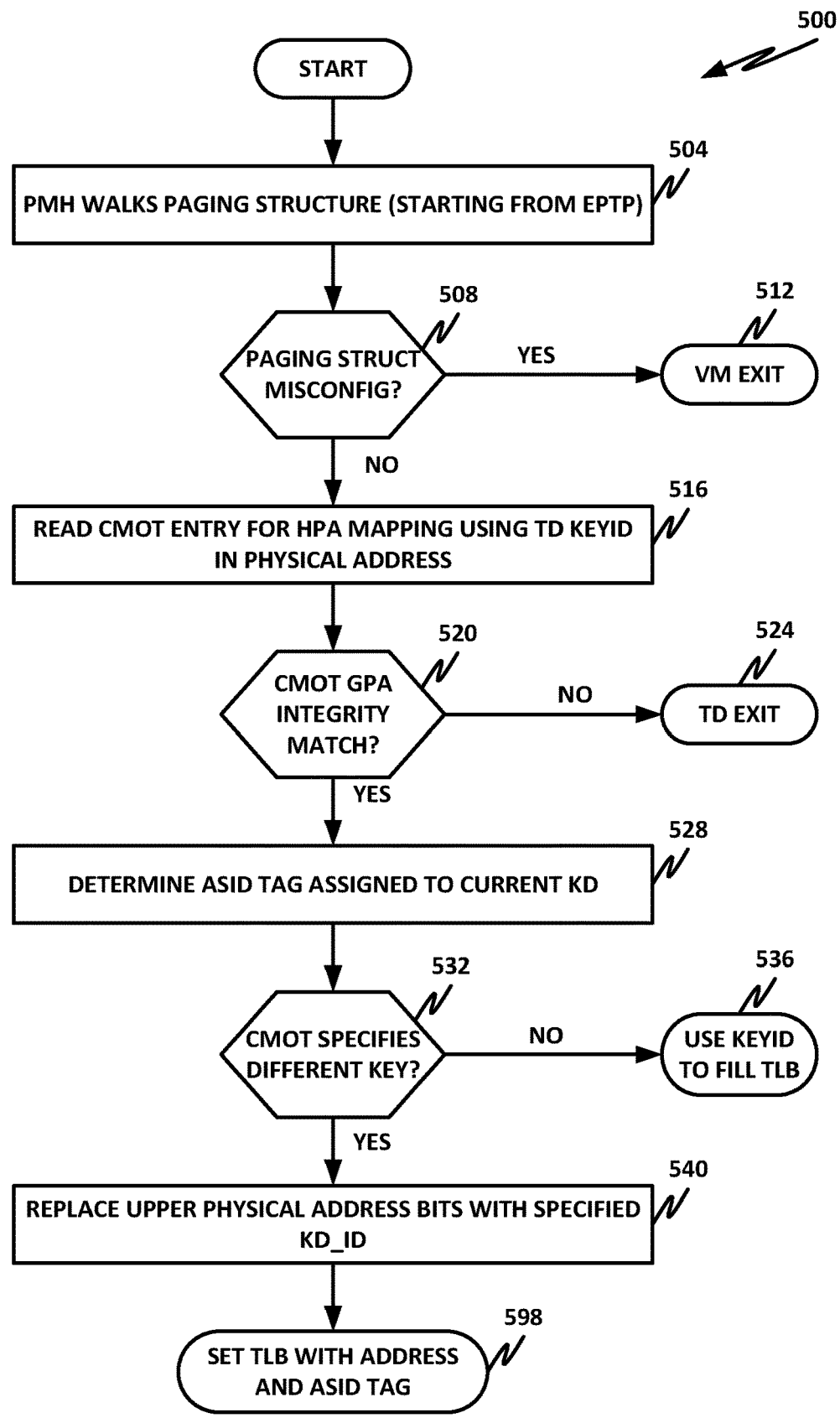
FIG. 5 is a flow diagram of a method that may be performed in conjunction with the teachings of the present specification.

FIG. 5 is a flow diagram of a method 500 that may be performed in conjunction with the teachings of the present specification.

Starting in block 504, the processor may encounter a page miss. Stemming from the page miss, the PMH may walk this paging structure, for example, starting from the EPTP.

In decision block 508, the processor, such as the MKTME engine, may determine whether there is a paging structure misconfiguration. If there is, then an error condition may be raised and, for example, in block 512 the VM may exit.

In block 516, as the processor is walking the memory page, it may read a CMOT entry for any HPM mapping that it finds using a TD key ID in its physical address space.

In decision block 520, when such a CMOT entry is encountered, the MKTME engine may determine whether the CMOT GPA integrity check matches the entry in the CMOT. This can include ensuring that both the TDCS pointer has a correct value, and that the CMOT entry has not been tampered with via the integrity field.

If the integrity check fails, then in block 524, an error condition may be raised, such as exiting the TD.

In block 528, the MKTME or other control structure may determine the current address space ID (ASID) tag assigned to the current KD for the CMOT entry.

In decision block 532, it is determined whether the CMOT specifies a different key from that ascertained in block 528. If not, then in block 536, the processor uses the key ID ASID to fill the TLB, for example, with a k-bit offset as specified in the CMOT entry.

Returning to block 532, if the CMOT specifies a different key, then in block 540, the processor replaces the upper physical address bits with the specified key domain identifier (KDID).

In block 598, the processor sets the TLB with the address and ASID tag given. And the process is done.

Note that in flow 500 illustrated above, the PMH may walk the page table and extended page tables as normal for an executing TD. At the terminal walk, the PMH accesses the CMOT entry associated with the found physical address from the page walk. It accesses the CMOT entry using the executing TD's private key ID. It then checks the CMOT entry's integrity value to ensure that it is not corrupt, as in decision block 520.

The CMOT maps the physical address to the guest physical address encrypted with the key for the trust domain. The host (VMM) VMX root may include instructions for permission to grant CMOT entries, including novel instructions such as TDADDPAGE and TDREVOKEPAGE. The tenant's TD assures that CMOT entries encrypted with the key are correct. The TDADD instruction uses the TD's KeyID. If the CMOT entry integrity is corrupt, then a TD exit may occur. Otherwise, it verifies the entry with the HPA to GPA mapping.

According to embodiments of the present specification, a hardware PMH provides EPT walks that switch to the VMM's KeyID. The PMH EPT walk ends with the CMOT table lookup using HPA as an index. The PMH may use the TD's exclusive KeyID or private KeyID to access the CMOT entry (appended to the HPA). It also verifies the entry's integrity. If the CMOT entry confirms the HPA to GPA mapping, then it caches the TLB. Otherwise, it exits. The entry can indicate the key to use if it is a shared page, or it may map to a large page. It may also verify permissions and other tenant policy.

| KeyID | TDCS | GPA | Permission | Encrypt | Version | Valid | Status |
|---|---|---|---|---|---|---|---|
| 1 | 1 | 5 | R/X/W | N | 3 | Y | A |
| 2 | 2 | 3 | R/W | N | 2 | Y | A |
| 3 | 3 | 1 | R/W | Y | 1 | Y | A |
| 1 | 4 | 4 | R | N | 3 | Y | A |
| 2 | 5 | 2 | X | N | 2 | N | F |

The table above illustrates how a CMOT table entry may be encrypted with the TD's private key or KeyID. The MKTME engine encrypts memory at a cache line granularity, which suggests that CMOT entries may be 512 bits in size to conform to the cache line. However, because the structure is exclusively CPU managed in certain embodiments, it is possible to use partial rights and limit each entry to an AES block size, such as 128 bits. The table may therefore be aligned so that each entry maps to a TME block size, 128-bit aligned. Corruption to any part of the AES block corrupts all bits equally, resulting in corruption to the integrity value. When the PMH causes a CMOT entry to be read, the MKTME may use the TD's private KeyID in the address to decrypt the entire 512-bit memory line. If a different key was used to encrypt and partially write different entries on the line, those entries are corrupt, but the specific entry accessed and read by the PMH with the correct KeyID is correct.

In some embodiments, in addition to or instead of an integrity value, a version number may be specified. This allows the CPU to avoid replay of entries. When a conflicting entry is observed, such as changing a shared or plaintext CMOT entry to one using a private or exclusive TD key, the CPU can increment the version number for all CMOT entries belonging to that TD. The PMH may then use the TD's current version (e.g., a protected CPU register counter for the TD) and compare this value to that stored in the MOT entry to ensure that the MOT entry was not replayed from some previous state.

Finally, other values can be used for integrity or replay prevention. For example, the TD's current context or CR3 value can be stored in an MOT entry field to bind an entry to a particular CR3 or context. Similarly, a linear address (LA) may be specified in the table where the PMH may check that the LA (in addition to the GPA) corresponds to the LA specified in the MOT entry, or else exit. Because not all CMOT entries may always check the context/LA, a bit field can be used to determine if an LA or context should be checked for a particular CMOT entry. This may be useful for input/output operations.

Certain of the figures below detail example architectures and systems to implement embodiments of the above. In some embodiments, one or more hardware components and/or instructions described above are emulated as detailed below, or implemented as software modules.

In certain examples, instruction(s) may be embodied in a "generic vector-friendly instruction format," which is detailed below. In other embodiments, another instruction format is used. The description below of the write mask registers, various data transformations (swizzle, broadcast, etc.), addressing, etc. is generally applicable to the description of the embodiments of the instruction(s) above. Additionally, example systems, architectures, and pipelines are detailed below. Embodiments of the instruction(s) above may be executed on those systems, architectures, and pipelines, but are not limited to those detailed.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are fewer fields included) and/or defined to have a given field interpreted differently. Thus, each instruction of an ISA is expressed using a given instruction format (and, if defined, in a given one of the instruction templates of that instruction format) and includes fields for specifying the operation and the operands. In one embodiment, an example ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the advanced vector extensions (AVXs) (AVX1 and AVX2), and using the vector extensions (VEX) coding scheme has been released and/or published (e.g., see Intel® 64 and IA-32 Architectures Software Developer's Manual, September 2014; and see Intel® Advanced Vector Extensions Programming Reference, October 2014).

Example Instruction Formats

Embodiments of the instruction(s) described herein may be embodied in different formats. Additionally, example systems, architectures, and pipelines are detailed below. Embodiments of the instruction(s) may be executed on such systems, architectures, and pipelines, but are not limited to those detailed.

Generic Vector-Friendly Instruction Format

A vector-friendly instruction format is an instruction format that is suited for vector instructions (e.g., there are certain fields specific to vector operations). While embodiments are described in which both vector and scalar operations are supported through the vector-friendly instruction format, alternative embodiments use only vector operations through the vector-friendly instruction format.

Figure 6A:
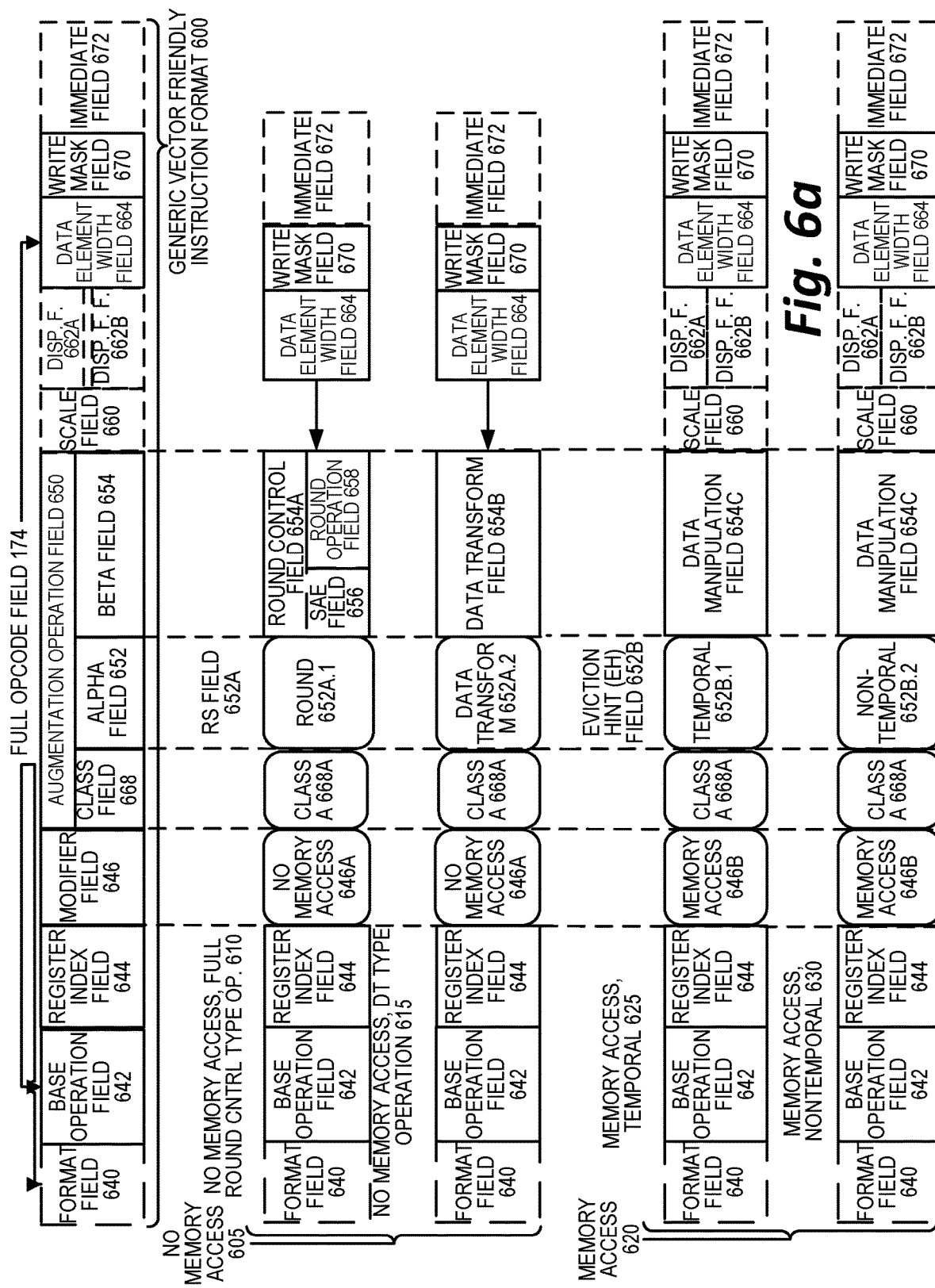
FIGS. 6a-6b are block diagrams illustrating a generic vector-friendly instruction format and instruction templates thereof according to one or more examples of the present specification.
Figure 6B:
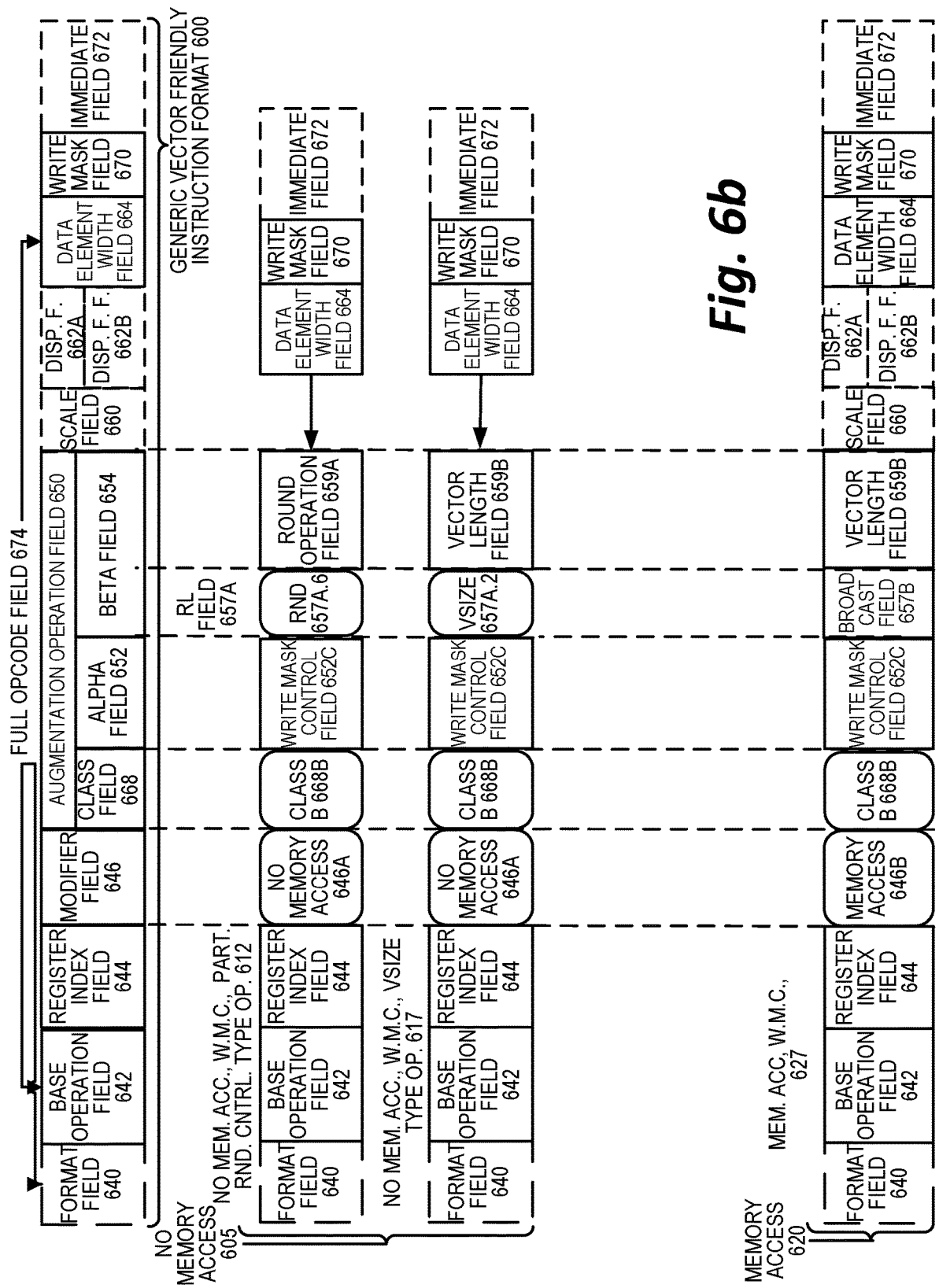

FIGS. 6a-6b are block diagrams illustrating a generic vector-friendly instruction format and instruction templates thereof according to embodiments of the specification. FIG. 6a is a block diagram illustrating a generic vector-friendly instruction format and class A instruction templates thereof according to embodiments of the specification; while FIG. 6b is a block diagram illustrating the generic vector-friendly instruction format and class B instruction templates thereof according to embodiments of the specification. Specifically, a generic vector-friendly instruction format 600 for which are defined class A and class B instruction templates, both of which include no memory access 605 instruction templates and memory access 620 instruction templates. The term generic in the context of the vector-friendly instruction format refers to the instruction format not being tied to any specific instruction set.

Embodiments of the specification will be described in which the vector-friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 6a include: 1) within the no memory access 605 instruction templates there is shown a no memory access, full round control type operation 610 instruction template and a no memory access, data transform type operation 615 instruction template; and 2) within the memory access 620 instruction templates there is shown a memory access, temporal 625 instruction template and a memory access, nontemporal 630 instruction template. The class B instruction templates in FIG. 6b include: 1) within the no memory access 605 instruction templates there is shown a no memory access, write mask control, partial round control type operation 612 instruction template and a no memory access, write mask control, VSIZE type operation 617 instruction template; and 2) within the memory access 620 instruction templates there is shown a memory access, write mask control 627 instruction template.

The generic vector-friendly instruction format 600 includes the following fields listed below in the order illustrated in FIGS. 6a-6b.

Format field 640—a specific value (an instruction format identifier value) in this field uniquely identifies the vector-friendly instruction format, and thus occurrences of instructions in the vector-friendly instruction format in instruction streams. As such, this field is optional in the sense that it is not needed for an instruction set that has only the generic vector-friendly instruction format.

Base operation field 642—its content distinguishes different base operations.

Register index field 644—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or fewer sources and destination registers (e.g., may support up to two sources where one of these sources also acts as the destination, may support up to three sources where one of these sources also acts as the destination, or may support up to two sources and one destination).

Modifier field 646—its content distinguishes occurrences of instructions in the generic vector instruction format that specify memory access from those that do not; that is, between no memory access 605 instruction templates and memory access 620 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, fewer, or different ways to perform memory address calculations.

Augmentation operation field 650—its content distinguishes which one of a variety of different operations to be performed in addition to the base operation. This field is context specific. In one embodiment of the specification, this field is divided into a class field 668, an alpha field 652, and a beta field 654. The augmentation operation field 650 allows common groups of operations to be performed in a single instruction rather than 2, 3, or 4 instructions.

Scale field 660—its content allows for the scaling of the index field's content for memory address generation (e.g., for address generation that uses $2^{scale}*index+base$).

Displacement Field 662A—its content is used as part of memory address generation (e.g., for address generation that uses $2^{scale}*index+base+displacement$).

Displacement Factor Field 662B (note that the juxtaposition of displacement field 662A directly over displacement factor field 662B indicates one or the other is used)—its content is used as part of address generation; it specifies a displacement factor that is to be scaled by the size of a memory access (N)—where N is the number of bytes in the memory access (e.g., for address generation that uses $2^{scale}*index+base+scaled\ displacement$). Redundant low-order bits are ignored and hence, the displacement factor field's content is multiplied by the memory operand's total size (N) in order to generate the final displacement to be used in calculating an effective address. The value of N is determined by the processor hardware at runtime based on the full opcode field 674 (described later herein) and the data manipulation field 654C. The displacement field 662A and the displacement factor field 662B are optional in the sense that they are not used for the no memory access 605 instruction templates and/or different embodiments may implement only one or none of the two.

Data element width field 664—its content distinguishes which one of a number of data element widths is to be used (in some embodiments, for all instructions; in other embodiments, for only some of the instructions). This field is optional in the sense that it is not needed if only one data element width is supported and/or data element widths are supported using some aspect of the opcodes.

Write mask field 670—its content controls, on a per data element position basis, whether that data element position in the destination vector operand reflects the result of the base operation and augmentation operation. Class A instruction templates support merging-write masking, while class B instruction templates support both merging and zeroing-write masking. When merging, vector masks allow any set of elements in the destination to be protected from updates during the execution of any operation (specified by the base operation and the augmentation operation)—in one embodiment, preserving the old value of each element of the destination where the corresponding mask bit has a 0. In contrast, when zeroing vector masks allow any set of elements in the destination to be zeroed during the execution of any operation (specified by the base operation and the augmentation operation), in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 670 allows for partial vector operations, including loads, stores, arithmetic, logical, etc. While embodiments of the specification are described in which the write mask field's 670 content selects one of a number of write mask registers that contains the write mask to be used (and thus the write mask field's 670 content indirectly identifies that masking to be performed), alternative embodiments instead or additionally allow the mask write field's 670 content to directly specify the masking to be performed.

Immediate field 672—its content allows for the specification of an immediate. This field is optional in the sense that is it not present in an implementation of the generic vector-friendly format that does not support immediate and it is not present in instructions that do not use an immediate.

Class field 668—its content distinguishes between different classes of instructions. With reference to FIGS. 6a-6b, the contents of this field select between class A and class B instructions. In FIGS. 6a-6b, rounded corner squares are used to indicate a specific value is present in a field (e.g., class A 668A and class B 668B for the class field 668 respectively in FIGS. 6a-6b).

Instruction Templates of Class A

In the case of the non-memory access 605 instruction templates of class A, the alpha field 652 is interpreted as an RS field 652A, whose content distinguishes which one of the different augmentation operation types are to be performed (e.g., round 652A.1 and data transform 652A.2 are respectively specified for the no memory access, round type operation 610 and the no memory access, data transform type operation 615 instruction templates), while the beta field 654 distinguishes which of the operations of the specified type is to be performed. In the no memory access 605 instruction templates, the scale field 660, the displacement field 662A, and the displacement scale filed 662B are not present.

No-Memory Access Instruction Templates—Full Round Control Type Operation

In the no memory access full round control type operation 610 instruction template, the beta field 654 is interpreted as a round control field 654A, whose content provides static rounding. While in the described embodiments of the specification the round control field 654A includes a suppress all floating point exceptions (SAE) field 656 and a round operation control field 658, alternative embodiments may encode both these concepts into the same field or only have one or the other of these concepts/fields (e.g., may have only the round operation control field 658).

SAE field 656—its content distinguishes whether or not to disable the exception event reporting; when the SAE field's 656 content indicates suppression is enabled, a given instruction does not report any kind of floating-point exception flag and does not raise any floating point exception handler.

Round operation control field 658—its content distinguishes which one of a group of rounding operations to perform (e.g., round-up, round-down, round-towards-zero and round-to-nearest). Thus, the round operation control field 658 allows for the changing of the rounding mode on a per instruction basis. In one embodiment of the specification where a processor includes a control register for specifying rounding modes, the round operation control field's 650 content overrides that register value.

No Memory Access Instruction Templates—Data Transform Type Operation

In the no memory access data transform type operation 615 instruction template, the beta field 654 is interpreted as a data transform field 654B, whose content distinguishes which one of a number of data transforms is to be performed (e.g., no data transform, swizzle, broadcast).

In the case of a memory access 620 instruction template of class A, the alpha field 652 is interpreted as an eviction hint field 652B, whose content distinguishes which one of the eviction hints is to be used (in FIG. 6a, temporal 652B.1 and nontemporal 652B.2 are respectively specified for the memory access, temporal 625 instruction template and the memory access, nontemporal 630 instruction template), while the beta field 654 is interpreted as a data manipulation field 654C, whose content distinguishes which one of a number of data manipulation operations (also known as primitives) is to be performed (e.g., no manipulation; broadcast; up conversion of a source; and down conversion of a destination). The memory access 620 instruction templates include the scale field 660, and optionally the displacement field 662A or the displacement scale field 662B.

Vector memory instructions perform vector loads from and vector stores to memory, with conversion support. As with regular vector instructions, vector memory instructions transfer data from/to memory in a data element-wise fashion, with the elements that are actually transferred as dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Nontemporal

Nontemporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 652 is interpreted as a write mask control (Z) field 652C, whose content distinguishes whether the write masking controlled by the write mask field 670 should be a merging or a zeroing.

In the case of the non-memory access 605 instruction templates of class B, part of the beta field 654 is interpreted as an RL field 657A, whose content distinguishes which one of the different augmentation operation types are to be performed (e.g., round 657A.1 and vector length (VSIZE) 657A.2 are respectively specified for the no memory access, write mask control, partial round control type operation 612 instruction template and the no memory access, write mask control, VSIZE type operation 617 instruction template), while the rest of the beta field 654 distinguishes which of the operations of the specified type is to be performed. In the no memory access 605 instruction templates, the scale field 660, the displacement field 662A, and the displacement scale field 662B are not present.

In the no memory access, write mask control, partial round control type operation 610 instruction template, the rest of the beta field 654 is interpreted as a round operation field 659A and exception event reporting is disabled (a given instruction does not report any kind of floating-point exception flag and does not raise any floating point exception handler).

Round operation control field 659A—just as round operation control field 658, its content distinguishes which one of a group of rounding operations to perform (e.g., round-up, round-down, round-towards-zero and round-to-nearest). Thus, the round operation control field 659A allows for the changing of the rounding mode on a per instruction basis. In one embodiment of the specification where a processor includes a control register for specifying rounding modes, the round operation control field's 650 content overrides that register value.

In the no memory access, write mask control, VSIZE type operation 617 instruction template, the rest of the beta field 654 is interpreted as a vector length field 659B, whose content distinguishes which one of a number of data vector lengths is to be performed on (e.g., 628, 256, or 512 byte).

In the case of a memory access 620 instruction template of class B, part of the beta field 654 is interpreted as a broadcast field 657B, whose content distinguishes whether or not the broadcast type data manipulation operation is to be performed, while the rest of the beta field 654 is interpreted by the vector length field 659B. The memory access 620 instruction templates include the scale field 660, and optionally the displacement field 662A or the displacement scale field 662B.

With regard to the generic vector-friendly instruction format 600, a full opcode field 674 is shown including the format field 640, the base operation field 642, and the data element width field 664. While one embodiment is shown where the full opcode field 674 includes all of these fields, the full opcode field 674 includes less than all of these fields in embodiments that do not support all of them. The full opcode field 674 provides the operation code (opcode).

The augmentation operation field 650, the data element width field 664, and the write mask field 670 allow these features to be specified on a per instruction basis in the generic vector-friendly instruction format.

The combination of write mask field and data element width field create typed instructions in that they allow the mask to be applied based on different data element widths.

The various instruction templates found within class A and class B are beneficial in different situations. In some embodiments of the specification, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the specification). Also, a single processor may include multiple cores, all of which support the same class or in which different cores support different classes. For instance, in a processor with separate graphics and general purpose cores, one of the graphics cores intended primarily for graphics and/or scientific computing may support only class A, while one or more of the general purpose cores may be high performance general purpose cores with out-of-order execution and register renaming intended for general-purpose computing that supports only class B. Another processor that does not have a separate graphics core may include one more general purpose in-order or out-of-order cores that support both class A and class B. Of course, features from one class may also be implemented in the other class in different embodiments of the specification. Programs written in a high level language would be put (e.g., just in time compiled or statically compiled) into an variety of different executable forms, including: 1) a form having only instructions of the class or classes supported by the target processor for execution; or 2) a form having alternative routines written using different combinations of the instructions of all classes and having control flow code that selects the routines to execute based on the instructions supported by the processor which is currently executing the code.

Example Specific Vector-Friendly Instruction Format

Figure 7A:
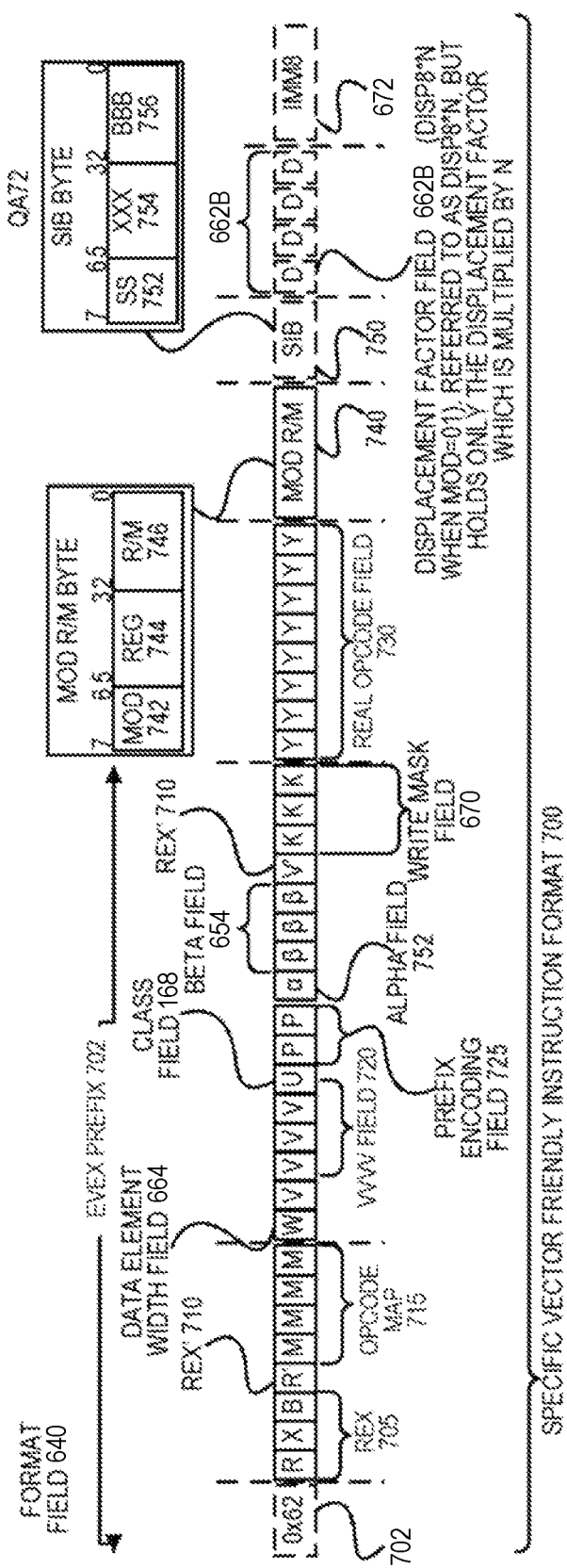
FIGS. 7a-7d are block diagrams illustrating an example specific vector-friendly instruction format according to one or more examples of the present specification.

FIG. 7a is a block diagram illustrating an example specific vector-friendly instruction format according to embodiments of the specification. FIG. 7a shows a specific vector-friendly instruction format 700 that is specific in the sense that it specifies the location, size, interpretation, and order of the fields, as well as values for some of those fields. The specific vector-friendly instruction format 700 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIGS. 6a and 6b into which the fields from FIG. 2 map are illustrated.

It should be understood that, although embodiments of the specification are described with reference to the specific vector-friendly instruction format 700 in the context of the generic vector-friendly instruction format 600 for illustrative purposes, the present specification is not limited to the specific vector-friendly instruction format 700 except where claimed. For example, the generic vector-friendly instruction format 600 contemplates a variety of possible sizes for the various fields, while the specific vector-friendly instruction format 700 is shown as having fields of specific sizes. By way of particular example, while the data element width field 664 is illustrated as a one bit field in the specific vector-friendly instruction format 700, the present specification is not so limited (that is, the generic vector-friendly instruction format 600 contemplates other sizes of the data element width field 664).

The generic vector-friendly instruction format 600 includes the following fields listed below in the order illustrated in FIG. 7a.

EVEX Prefix (Bytes 0-3) 702—is encoded in a four-byte form.

Format Field 640 (EVEX Byte 0, bits [7:0])—the first byte (EVEX Byte 0) is the format field 640 and it contains 0x62 (the unique value used for distinguishing the vector-friendly instruction format in one embodiment).

The second through fourth bytes (EVEX Bytes 1-3) include a number of bit fields providing specific capability.

REX field 705 (EVEX Byte 1, bits [7-5])—consists of an EVEX.R bit field (EVEX Byte 1, bit [7]—R), EVEX.X bit field (EVEX byte 1, bit [6]—X), and 157BEX byte 1, bit[5]—B). The EVEX.R, EVEX.X, and EVEX.B bit fields provide the same functionality as the corresponding VEX bit fields, and are encoded using 1s complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 610—this is the first part of the REX' field 610 and is the EVEX.R' bit field (EVEX Byte 1, bit [4]—R') that is used to encode either the upper 16 or lower 16 of the extended 32 register set. In one embodiment, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; other embodiments do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 715 (EVEX byte 1, bits [3:0]—mmmm)—its content encodes an implied leading opcode byte (OF, OF 38, or OF 3).

Data element width field 664 (EVEX byte 2, bit [7]—W)—is represented by the notation EVEX.W. EVEX.W is used to define the granularity (size) of the datatype (either 32-bit data elements or 64-bit data elements).

EVEX.vvvv 720 (EVEX Byte 2, bits [6:3]—vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 1111b. Thus, EVEX.vvvv field 720 encodes the 4 low-order bits of the first source register specifier stored in inverted (1s complement) form. Depending on the instruction, an extra different EVEX bit field is used to extend the specifier size to 32 registers.

EVEX.U 168 Class field (EVEX byte 2, bit [2]—U)—if EVEX.U=0, it indicates class A or EVEX.U0; if EVEX.U=1, it indicates class B or EVEX.U1.

Prefix encoding field 725 (EVEX byte 2, bits [1:0]—pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use an SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 652 (EVEX byte 3, bit [7]—EH; also known as EVEX.eh, EVEX.rs, EVEX.rl, EVEX.write mask control, and EVEX.n; also illustrated with α)—as previously described, this field is context specific.

Beta field 654 (EVEX byte 3, bits [6:4]—SSS, also known as EVEX.$S_{2-0}$, EVEX.$r_{2-0}$, EVEX.rr1, EVEX.LL0, EVEX.LLB; also illustrated with βββ)—as previously described, this field is context specific.

REX' field 610—this is the remainder of the REX' field and is the EVEX.V' bit field (EVEX Byte 3, bit [3]—V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 670 (EVEX byte 3, bits [2:0]—kkk)—its content specifies the index of a register in the write mask registers as previously described. In one embodiment, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 730 (Byte 4) is also known as the opcode byte. Part of the opcode is specified in this field.

MOD R/M Field 740 (Byte 5) includes MOD field 742, Reg field 744, and R/M field 746. As previously described, the MOD field's 742 content distinguishes between memory access and non-memory access operations. The role of Reg field 744 can be summarized to two situations: encoding either the destination register operand or a source register operand, or be treated as an opcode extension and not used to encode any instruction operand. The role of R/M field 746 may include the following: encoding the instruction operand that references a memory address, or encoding either the destination register operand or a source register operand.

Scale, Index, Base (SIB) Byte (Byte 6)—as previously described, the scale field's 650 content is used for memory address generation. SIB.xxx 754 and SIB.bbb 756—the contents of these fields have been previously referred to with regard to the register indexes Xxxx and Bbbb.

Displacement field 662A (Bytes 7-10)—when MOD field 742 contains 10, bytes 7-10 are the displacement field 662A, and it works the same as the legacy 32-bit displacement (disp32) and works at byte granularity.

Displacement factor field 662B (Byte 7)—when MOD field 742 contains 01, byte 7 is the displacement factor field 662B. The location of this field is the same as that of the legacy x86 instruction set 8-bit displacement (disp8), which works at byte granularity. Since disp8 is sign extended, it can only address between 128 and 127-byte offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 662B is a reinterpretation of disp8; when using displacement factor field 662B, the actual displacement is determined by the content of the displacement factor field multiplied by the size of the memory operand access (N). This type of displacement is referred to as disp8*N. This reduces the average instruction length (a single byte used for the displacement but with a much greater range). Such compressed displacement is based on the assumption that the effective displacement is a multiple of the granularity of the memory access, and hence, the redundant low-order bits of the address offset do not need to be encoded. In other words, the displacement factor field 662B substitutes the legacy x86 instruction set 8-bit displacement. Thus, the displacement factor field 662B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 672 operates as previously described.

Full Opcode Field

Figure 7B:
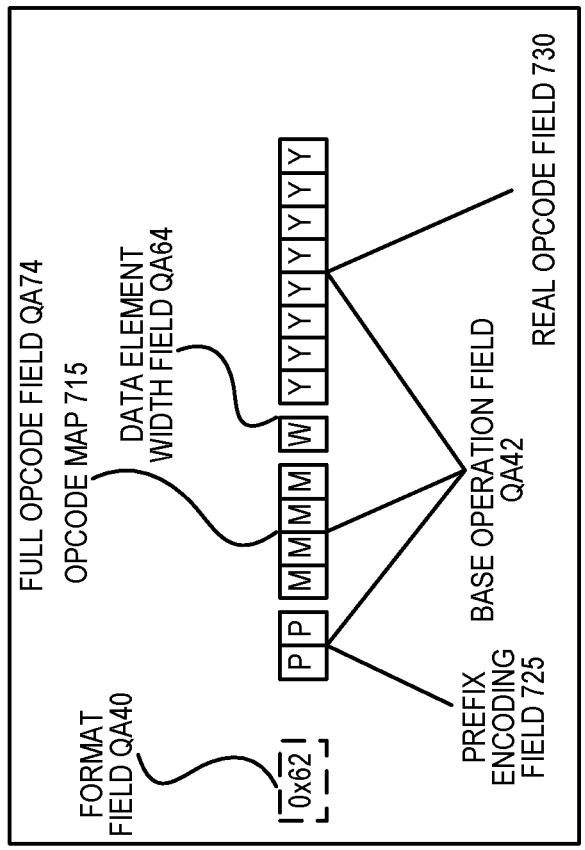

FIG. 7b is a block diagram illustrating the fields of the specific vector-friendly instruction format 700 that make up the full opcode field 674 according to one embodiment. Specifically, the full opcode field 674 includes the format field 640, the base operation field 642, and the data element width (W) field 664. The base operation field 642 includes the prefix encoding field 725, the opcode map field 715, and the real opcode field 730.

Register Index Field

Figure 7C:
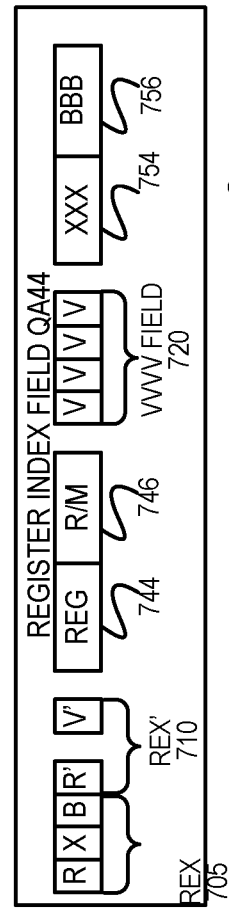

FIG. 7c is a block diagram illustrating the fields of the specific vector-friendly instruction format 700 that make up the register index field 644 according to one embodiment. Specifically, the register index field 644 includes the REX field 705, the REX' field 710, the MODR/M.reg field 744, the MODR/M.r/m field 746, the VVVV field 720, xxx field 754, and the bbb field 756.

Augmentation Operation Field

Figure 7D:
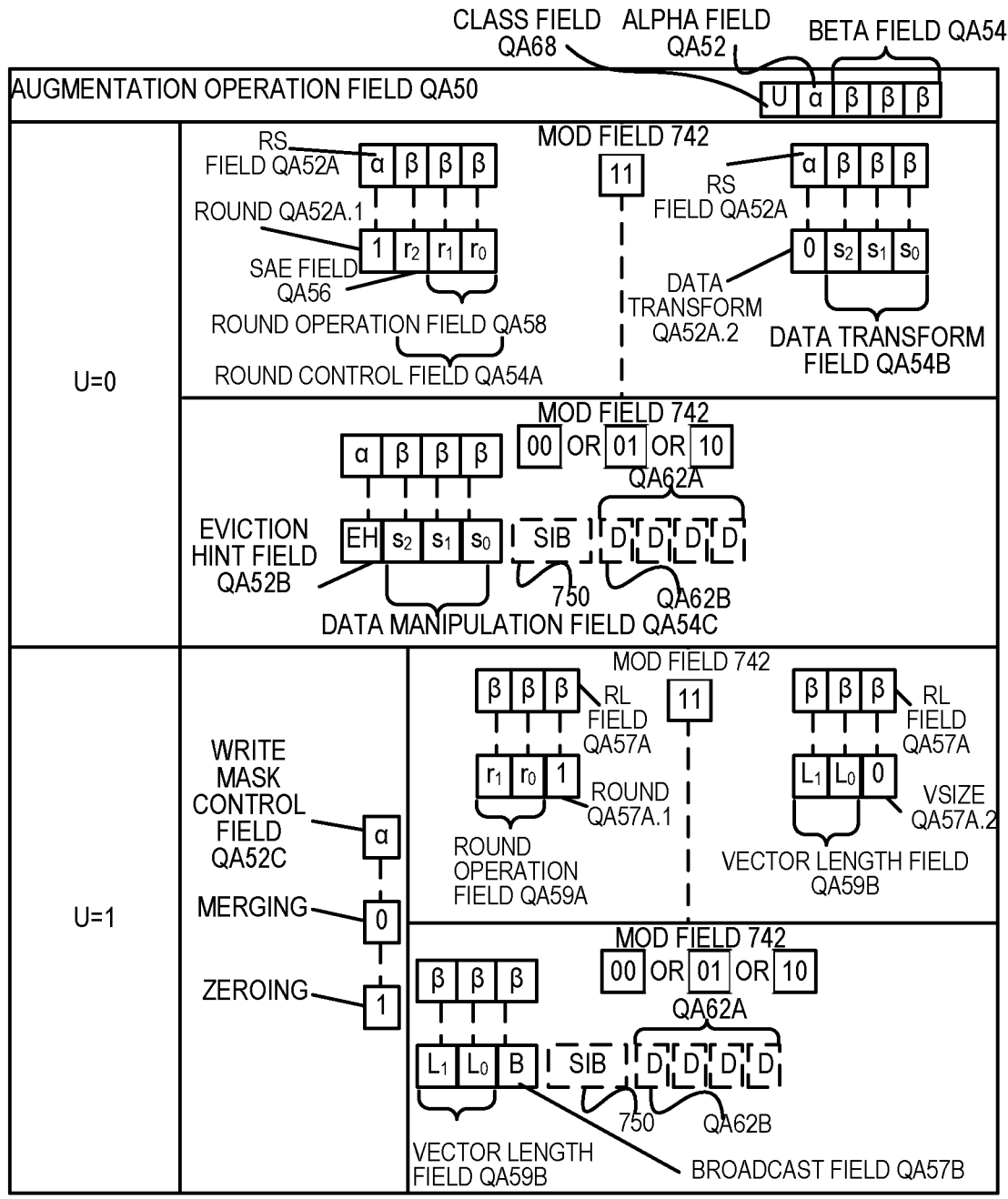

FIG. 7d is a block diagram illustrating the fields of the specific vector-friendly instruction format 700 that make up the augmentation operation field 650 according to one embodiment. When the class (U) field 668 contains 0, it signifies EVEX.U0 (class A 668A); when it contains 1, it signifies EVEX.U1 (class B 668B). When U=0 and the MOD field 742 contains 11 (signifying a no memory access operation), the alpha field 652 (EVEX byte 3, bit [7]—EH) is interpreted as the rs field 652A. When the rs field 652A contains a 1 (round 652A.1), the beta field 654 (EVEX byte 3, bits [6:4]—SSS) is interpreted as the round control field 654A. The round control field 654A includes a one bit SAE field 656 and a two bit round operation field 658. When the rs field 652A contains a 0 (data transform 652A.2), the beta field 654 (EVEX byte 3, bits [6:4]—SSS) is interpreted as a three bit data transform field 654B. When U=0 and the MOD field 742 contains 00, 01, or 10 (signifying a memory access operation), the alpha field 652 (EVEX byte 3, bit [7]—EH) is interpreted as the eviction hint (EH) field 652B and the beta field 654 (EVEX byte 3, bits [6:4]—SSS) is interpreted as a three bit data manipulation field 654C.

When U=1, the alpha field 652 (EVEX byte 3, bit [7]—EH) is interpreted as the write mask control (Z) field 652C. When U=1 and the MOD field 742 contains 11 (signifying a no memory access operation), part of the beta field 654 (EVEX byte 3, bit [4]—$S_0$) is interpreted as the RL field 657A; when it contains a 1 (round 657A.1) the rest of the beta field 654 (EVEX byte 3, bit [6-5]—$S_{2-1}$) is interpreted as the round operation field 659A, while when the RL field 657A contains a 0 (VSIZE 657.A2) the rest of the beta field 654 (EVEX byte 3, bit [6-5]—$S_{2-1}$) is interpreted as the vector length field 659B (EVEX byte 3, bit [6-5]—$L_{1-0}$). When U=1 and the MOD field 742 contains 00, 01, or 10 (signifying a memory access operation), the beta field 654 (EVEX byte 3, bits [6:4]—SSS) is interpreted as the vector length field 659B (EVEX byte 3, bit [6-5]—$L_{1-0}$) and the broadcast field 657B (EVEX byte 3, bit [4]—B).

Example Register Architecture

Figure 8:
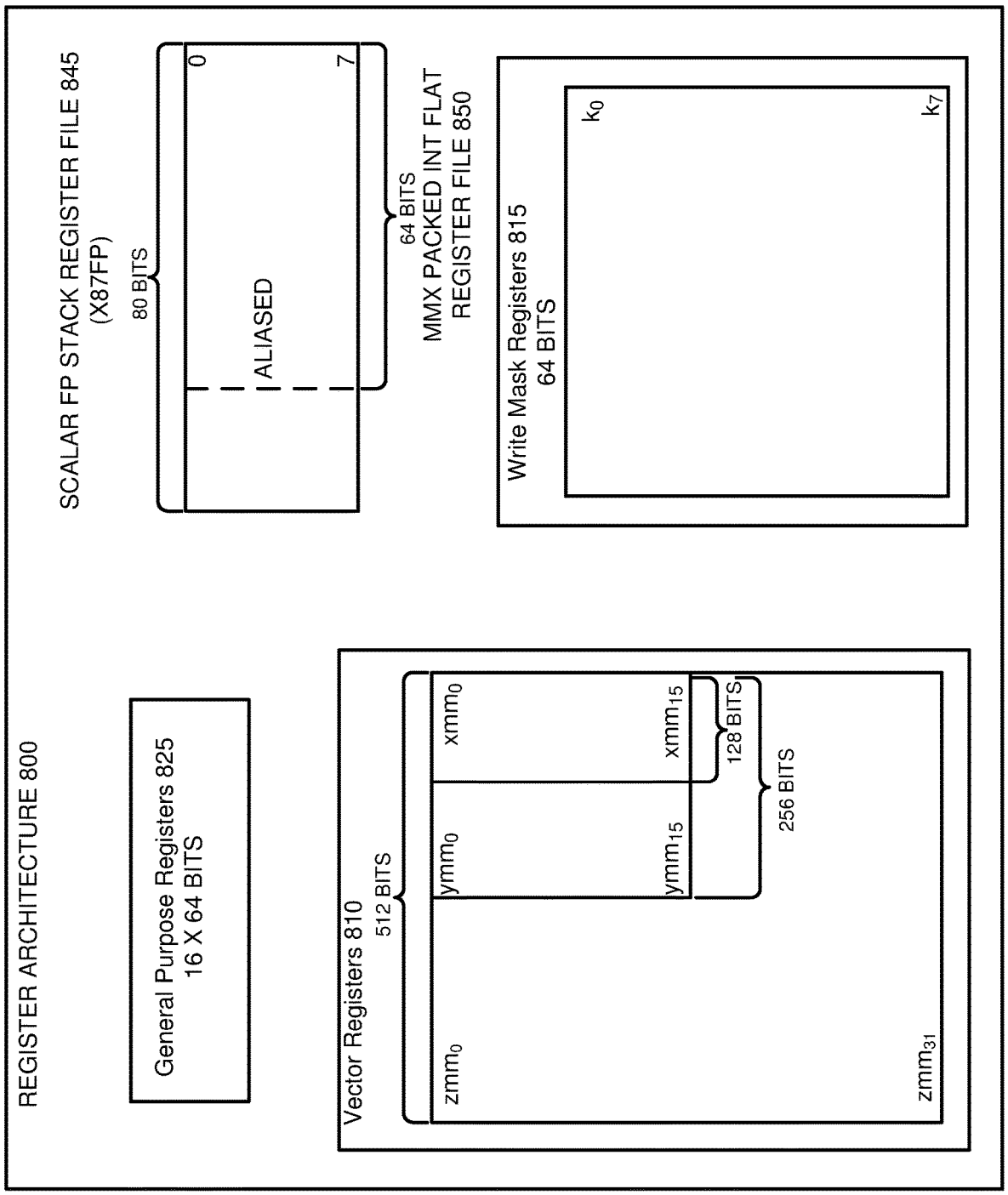
FIG. 8 is a block diagram of a register architecture according to one or more examples of the present specification.

FIG. 8 is a block diagram of a register architecture 800 according to one embodiment. In the embodiment illustrated, there are 32 vector registers 810 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector-friendly instruction format 700 operates on these overlaid register files as illustrated in the below tables.

| Adjustable Vector Length | Class | Operations | Registers |
| --- | --- | --- | --- |
| Instruction Templates that do not include the vector length field 659B | A (FIG. 6A; U = 0) | 610, 615, 625, 630 | zmm registers (the vector length is 64 byte) |
| | B (FIG. 6B; U = 1) | 612 | zmm registers (the vector length is 64 byte) |
| Instruction templates that do include the vector length field 659B | B (FIG. 6B; U = 1) | 617, 627 | zmm, ymm, or xmm registers (the vector length is 64 byte, 32 byte, or 16 byte) depending on the vector length field 659B |

In other words, the vector length field 659B selects between a maximum length and one or more other shorter lengths, where each such shorter length is half the length of the preceding length; and instruction templates without the vector length field 659B operate on the maximum vector length. Further, in one embodiment, the class B instruction templates of the specific vector-friendly instruction format 700 operate on packed or scalar single/double-precision floating point data and packed or scalar integer data. Scalar operations are operations performed on the lowest order data element position in a zmm/ymm/xmm register; the higher order data element positions are either left the same as they were prior to the instruction or zeroed depending on the embodiment.

Write mask registers 815—in the embodiment illustrated, there are 8 write mask registers (k0 through k7), each 64 bits in size. In an alternate embodiment, the write mask registers 815 are 16 bits in size. As previously described, in one embodiment, the vector mask register k0 cannot be used as a write mask; when the encoding that would normally indicate k0 is used for a write mask, it selects a hardwired write mask of 0xFFFF, effectively disabling write masking for that instruction.

General-purpose registers 825—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 845, on which is aliased the MMX packed integer flat register file 850—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Other embodiments may use wider or narrower registers. Additionally, other embodiments may use more, less, or different register files and registers.

Example Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific throughput. Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Example core architectures are described next, followed by descriptions of example processors and computer architectures.

Example Core Architectures

In-Order and Out-of-Order Core Block Diagram

FIG. 9a is a block diagram illustrating both an example in-order pipeline and an example register renaming, out-of-order issue/execution pipeline. FIG. 9b is a block diagram illustrating both an embodiment of an in-order architecture core and an example register renaming, out-of-order issue/execution architecture core to be included in a processor. The solid lined boxes in FIGS. 9a-9b illustrate the in-order pipeline and in-order core, while the optional addition of the dashed, lined boxes illustrates the register renaming, out-of-order issue/execution pipeline and core. Given that the in-order aspect is a subset of the out-of-order aspect, the out-of-order aspect will be described.

In FIG. 9a, a processor pipeline 900 includes a fetch stage 902, a length decode stage 904, a decode stage 906, an allocation stage 908, a renaming stage 910, a scheduling (also known as a dispatch or issue) stage 912, a register read/memory read stage 914, an execute stage 916, a write back/memory write stage 918, an exception handling stage 922, and a commit stage 924.

FIG. 9b shows processor core 990 including a front end unit 930 coupled to an execution engine unit 950, and both are coupled to a memory unit 970. The core 990 may be a reduced instruction set computing (RISC) core, a complex instruction set computing (CISC) core, a very long instruction word (VLIW) core, or a hybrid or alternative core type. As yet another option, the core 990 may be a special-purpose core, such as, for example, a network or communication core, compression engine, coprocessor core, general purpose computing graphics processing unit (GPGPU) core, graphics core, or the like.

The front end unit 930 includes a branch prediction unit 932 coupled to an instruction cache unit 934, which is coupled to an instruction translation lookaside buffer (TLB) 936, which is coupled to an instruction fetch unit 938, which is coupled to a decode unit 940. The decode unit 940 (or decoder) may decode instructions, and generate as an output one or more micro-operations, micro-code entry points, microinstructions, other instructions, or other control signals, which are decoded from, or which otherwise reflect, or are derived from, the original instructions. The decode unit 940 may be implemented using various different mechanisms. Examples of suitable mechanisms include, but are not limited to, look-up tables, hardware implementations, programmable logic arrays (PLAs), microcode read only memories (ROMs), etc. In one embodiment, the core 990 includes a microcode ROM or other medium that stores microcode for certain macroinstructions (e.g., in decode unit 940 or otherwise within the front end unit 930). The decode unit 940 is coupled to a rename/allocator unit 952 in the execution engine unit 950.

The execution engine unit 950 includes the rename/allocator unit 952 coupled to a retirement unit 954 and a set of one or more scheduler unit(s) 956. The scheduler unit(s) 956 represents any number of different schedulers, including reservation stations, central instruction window, etc. The scheduler unit(s) 956 is coupled to the physical register file(s) unit(s) 958. Each of the physical register file(s) units 958 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 958 comprises a vector registers unit, a write mask registers unit, and a scalar registers unit. These register units may provide architectural vector registers, vector mask registers, and general purpose registers. The physical register file(s) unit(s) 958 is overlapped by the retirement unit 954 to illustrate various ways in which register renaming and out-of-order execution may be implemented (e.g., using a reorder buffer(s) and a retirement register file(s); using a future file(s), a history buffer(s), and a retirement register file(s); using register maps and a pool of registers; etc.). The retirement unit 954 and the physical register file(s) unit(s) 958 are coupled to the execution cluster(s) 960. The execution cluster(s) 960 includes a set of one or more execution units 962 and a set of one or more memory access units 964. The execution units 962 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 956, physical register file(s) unit(s) 958, and execution cluster(s) 960 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 964). It should also be understood that where separate pipelines are used, one or more of these pipelines may be out-of-order issue/execution and the rest in-order.

The set of memory access units 964 is coupled to the memory unit 970, which includes a data TLB unit 972 coupled to a data cache unit 974 coupled to a level 2 (L2) cache unit 976. In one embodiment, the memory access units 964 may include a load unit, a store address unit, and a store data unit, each of which is coupled to the data TLB unit 972 in the memory unit 970. The instruction cache unit 934 is further coupled to a level 2 (L2) cache unit 976 in the memory unit 970. The L2 cache unit 976 is coupled to one or more other levels of cache and eventually to a main memory.

By way of example, the register renaming, out-of-order issue/execution core architecture may implement the pipeline 900 as follows: 1) the instruction fetch 938 performs the fetch and length decoding stages 902 and 904; 2) the decode unit 940 performs the decode stage 906; 3) the rename/allocator unit 952 performs the allocation stage 908 and renaming stage 910; 4) the scheduler unit(s) 956 performs the schedule stage 912; 5) the physical register file(s) unit(s) 958 and the memory unit 970 perform the register read/memory read stage 914; the execution cluster 960 performs the execute stage 916; 6) the memory unit 970 and the physical register file(s) unit(s) 958 perform the write back/memory write stage 918; 7) various units may be involved in the exception handling stage 922; and 8) the retirement unit 954 and the physical register file(s) unit(s) 958 perform the commit stage 924.

The core 990 may support one or more instruction sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 990 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 934/974 and a shared L2 cache unit 976, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Example in-Order Core Architecture

FIGS. 10a-10b illustrate a block diagram of a more specific example in-order core architecture, which core would be one of several logic blocks (including other cores of the same type and/or different types) in a chip. The logic blocks communicate through a high-bandwidth interconnect network (e.g., a ring network) with some fixed function logic, memory IO interfaces, and other necessary IO logic, depending on the application.

FIG. 10a is a block diagram of a single processor core, along with its connection to the on-die interconnect network 1002 and with its local subset of the Level 2 (L2) cache 1004, according to one or more embodiments. In one embodiment, an instruction decoder 1000 supports the x86 instruction set with a packed data instruction set extension. An L1 cache 1006 allows low-latency accesses to cache memory into the scalar and vector units. While in one embodiment (to simplify the design), a scalar unit 1008 and a vector unit 1010 use separate register sets (respectively, scalar registers 1012 and vector registers 1014) and data transferred between them is written to memory and then read back in from a level 1 (L1) cache 1006, other embodiments may use a different approach (e.g., use a single register set or include a communication path that allows data to be transferred between the two register files without being written and read back).

The local subset of the L2 cache 1004 is part of a global L2 cache that is divided into separate local subsets, one per processor core. Each processor core has a direct access path to its own local subset of the L2 cache 1004. Data read by a processor core is stored in its L2 cache subset 1004 and can be accessed quickly, in parallel with other processor cores accessing their own local L2 cache subsets. Data written by a processor core is stored in its own L2 cache subset 1004 and is flushed from other subsets, if necessary. The ring network ensures coherency for shared data. The ring network is bi-directional to allow agents such as processor cores, L2 caches and other logic blocks to communicate with each other within the chip. Each ring data-path is 6012-bits wide per direction.

FIG. 10b is an expanded view of part of the processor core in FIG. 10a according to embodiments of the specification. FIG. 10b includes an L1 data cache 1006A, part of the L1 cache 1004, as well as more detail regarding the vector unit 1010 and the vector registers 1014. Specifically, the vector unit 1010 is a 16-wide vector processing unit (VPU) (see the 16-wide ALU 1028), which executes one or more of integer, single-precision float, and double-precision float instructions. The VPU supports swizzling the register inputs with swizzle unit 1020, numeric conversion with numeric convert units 1022A-B, and replication with replication unit 1024 on the memory input. Write mask registers 1026 allow predicating resulting vector writes.

Figure 11:
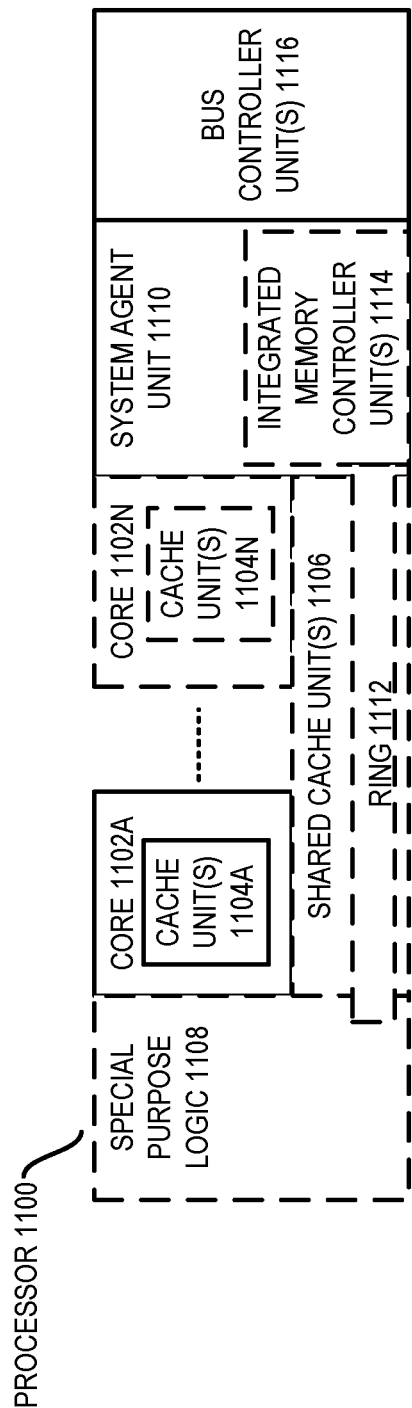
FIG. 11 is a block diagram of a processor that may have more than one core, may have an integrated memory controller, and may have integrated graphics according to one or more examples of the present specification.

FIG. 11 is a block diagram of a processor 1100 that may have more than one core, may have an integrated memory controller, and may have integrated graphics according to embodiments of the specification. The solid lined boxes in FIG. 6 illustrate a processor 1100 with a single core 1102A, a system agent 1110, a set of one or more bus controller units 1116, while the optional addition of the dashed lined boxes illustrates an alternative processor 1100 with multiple cores 1102A-N, a set of one or more integrated memory controller unit(s) 1114 in the system agent unit 1110, and special purpose logic 1108.

Thus, different implementations of the processor 1100 may include: 1) a CPU with the special purpose logic 1108 being integrated graphics and/or scientific (throughput) logic (which may include one or more cores), and the cores 1102A-N being one or more general purpose cores (e.g., general purpose in-order cores, general purpose out-of-order cores, a combination of the two); 2) a coprocessor with the cores 1102A-N being a large number of special purpose cores intended primarily for graphics and/or scientific throughput; and 3) a coprocessor with the cores 1102A-N being a large number of general purpose in-order cores. Thus, the processor 1100 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1100 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1106, and external memory (not shown) coupled to the set of integrated memory controller units 1114. The set of shared cache units 1106 may include one or more mid-level caches, such as level 2 (L2), level 3 (L3), level 4 (L4), or other levels of cache, a last level cache (LLC), and/or combinations thereof. While in one embodiment a ring based interconnect unit 1112 interconnects the integrated graphics logic 1108, the set of shared cache units 1106, and the system agent unit 1110/integrated memory controller unit(s) 1114, alternative embodiments may use any number of well-known techniques for interconnecting such units. In one embodiment, coherency is maintained between one or more cache units 1106 and cores 1102A-N.

In some embodiments, one or more of the cores 1102A-N are capable of multi-threading. The system agent 1110 includes those components coordinating and operating cores 1102A-N. The system agent unit 1110 may include, for example, a power control unit (PCU) and a display unit. The PCU may be or include logic and components needed for regulating the power state of the cores 1102A-N and the integrated graphics logic 1108. The display unit is for driving one or more externally connected displays.

The cores 1102A-N may be homogenous or heterogeneous in terms of architecture instruction set; that is, two or more of the cores 1102A-N may be capable of executing the same instruction set, while others may be capable of executing only a subset of that instruction set or a different instruction set.

Example Computer Architectures

FIGS. 12-15 are block diagrams of example computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 12:
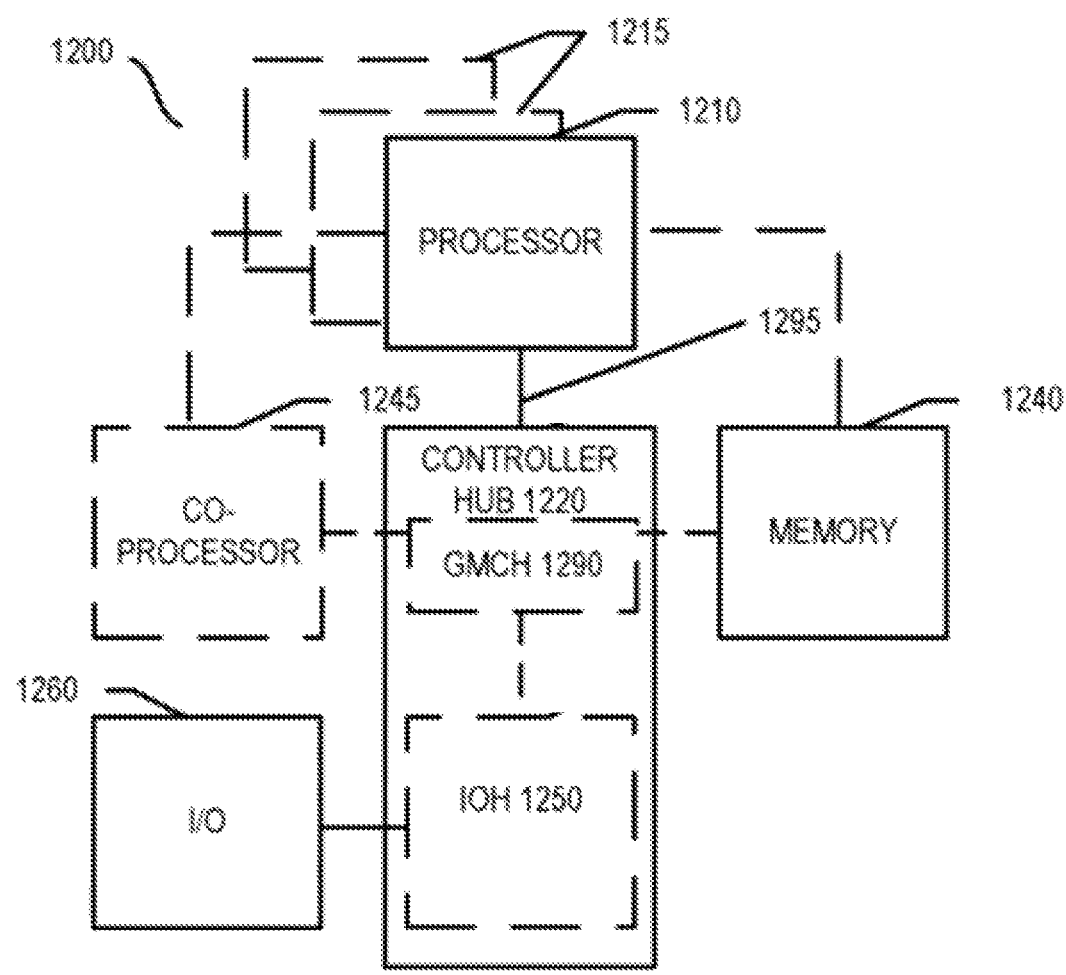
FIGS. 12-15 are block diagrams of computer architectures according to one or more examples of the present specification.

Referring now to FIG. 12, shown is a block diagram of a system 1200 in accordance with one embodiment. The system 1200 may include one or more processors 1210, 1215, which are coupled to a controller hub 1220. In one embodiment the controller hub 1220 includes a graphics memory controller hub (GMCH) 1290 and an Input/Output Hub (IOH) 1250 (which may be on separate chips); the GMCH 1290 includes memory and graphics controllers to which are coupled memory 1240 and a coprocessor 1245;

the IOH 1250 couples input/output (IO) devices 1260 to the GMCH 1290. Alternatively, one or both of the memory and graphics controllers are integrated within the processor (as described herein), the memory 1240 and the coprocessor 1245 are coupled directly to the processor 1210, and the controller hub 1220 in a single chip with the IOH 1250.

The optional nature of additional processors 1215 is denoted in FIG. 7 with broken lines. Each processor 1210, 1215 may include one or more of the processing cores described herein and may be some version of the processor 1100.

The memory 1240 may be, for example, dynamic random access memory (DRAM), phase change memory (PCM), or a combination of the two. For at least one embodiment, the controller hub 1220 communicates with the processor(s) 1210, 1215 via a multidrop bus, such as a frontside bus (FSB), point-to-point interface such as Ultra Path Interconnect (UPI), or similar connection 1295.

In one embodiment, the coprocessor 1245 is a special-purpose processor, such as, for example, a high-throughput MIC processor, a network or communication processor, compression engine, graphics processor, GPGPU, embedded processor, or the like. In one embodiment, controller hub 1220 may include an integrated graphics accelerator.

There can be a variety of differences between the physical resources 1210, 1215 in terms of a spectrum of metrics of merit including architectural, microarchitectural, thermal, power consumption characteristics, and the like.

In one embodiment, the processor 1210 executes instructions that control data processing operations of a general type. Embedded within the instructions may be coprocessor instructions. The processor 1210 recognizes these coprocessor instructions as being of a type that should be executed by the attached coprocessor 1245. Accordingly, the processor 1210 issues these coprocessor instructions (or control signals representing coprocessor instructions) on a coprocessor bus or other interconnect, to coprocessor 1245. Coprocessor(s) 1245 accepts and executes the received coprocessor instructions.

Figure 13:
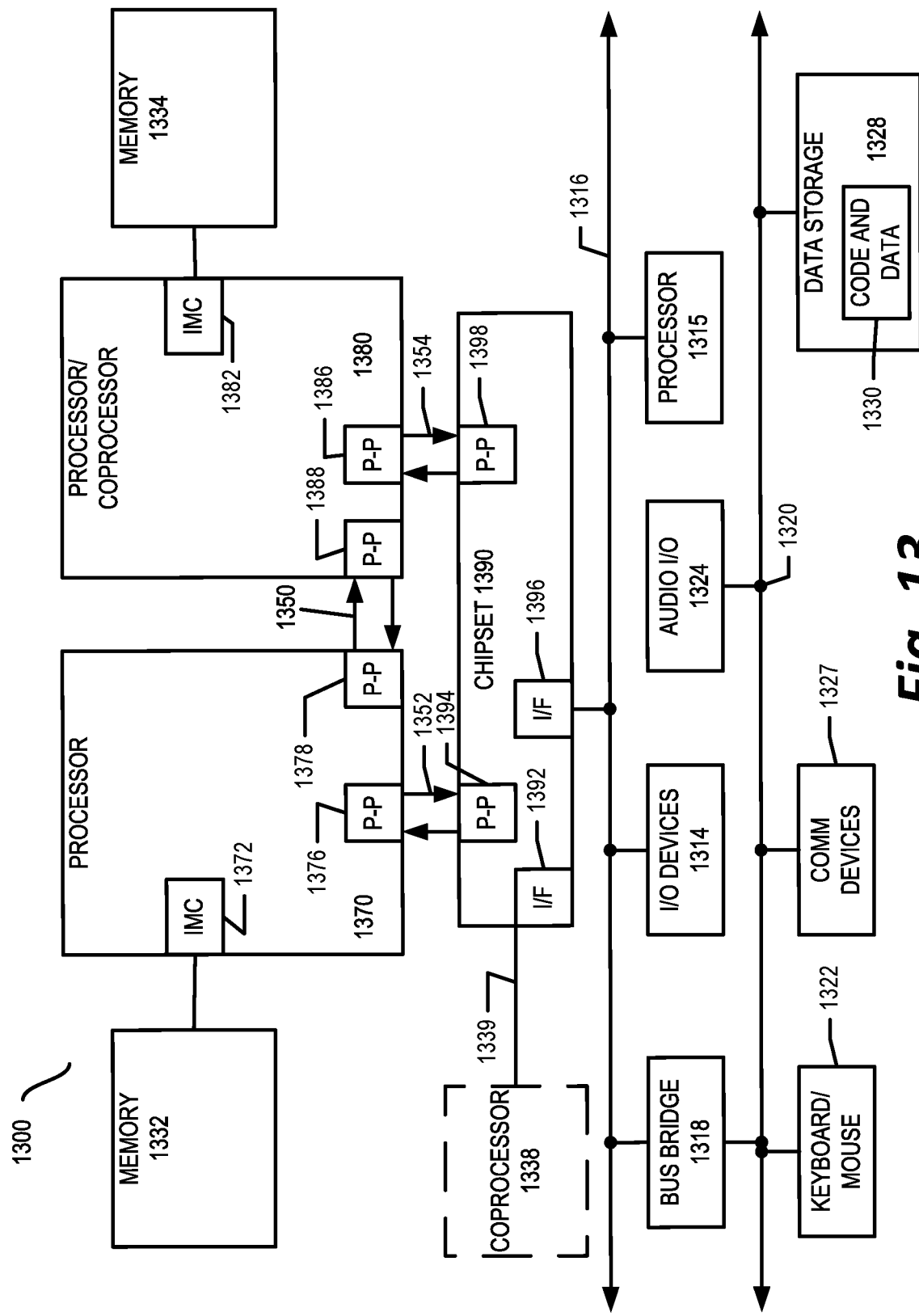

Referring now to FIG. 13, shown is a block diagram of a first more specific example system 1300. As shown in FIG. 13, multiprocessor system 1300 is a point-to-point interconnect system, and includes a first processor 1370 and a second processor 1380 coupled via a point-to-point interconnect 1350. Each of processors 1370 and 1380 may be some version of the processor 1100. In one embodiment, processors 1370 and 1380 are respectively processors 1210 and 1215, while coprocessor 1338 is coprocessor 1245. In another embodiment, processors 1370 and 1380 are respectively processor 1210 coprocessor 1245.

Processors 1370 and 1380 are shown including integrated memory controller (IMC) units 1372 and 1382, respectively. Processor 1370 also includes as part of its bus controller units point-to-point (P-P) interfaces 1376 and 1378; similarly, second processor 1380 includes P-P interfaces 1386 and 1388. Processors 1370, 1380 may exchange information via a point-to-point (P-P) interface 1350 using P-P interface circuits 1378, 1388. As shown in FIG. 13, IMCs 1372 and 1382 couple the processors to respective memories, namely a memory 1332 and a memory 1334, which may be portions of main memory locally attached to the respective processors.

Processors 1370, 1380 may each exchange information with a chipset 1390 via individual P-P interfaces 1352, 1354 using point to point interface circuits 1376, 1394, 1386, 1398. Chipset 1390 may optionally exchange information with the coprocessor 1338 via a high-performance interface 1339. In one embodiment, the coprocessor 1338 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a peripheral component interconnect (PCI) bus, or a bus such as a PCI Express bus or another third generation IO interconnect bus, by way of nonlimiting example.

As shown in FIG. 13, various IO devices 1314 may be coupled to first bus 1316, along with a bus bridge 1318 which couples first bus 1316 to a second bus 1320. In one embodiment, one or more additional processor(s) 1315, such as coprocessors, high-throughput MIC processors, GPGPUs, accelerators (such as, e.g., graphics accelerators or digital signal processing (DSP) units), field programmable gate arrays, or any other processor, are coupled to first bus 1316. In one embodiment, second bus 1320 may be a low pin count (LPC) bus. Various devices may be coupled to a second bus 1320 including, for example, a keyboard and/or mouse 1322, communication devices 1327 and a storage unit 1328 such as a disk drive or other mass storage device which may include instructions or code and data 1330, in one embodiment. Further, an audio IO 1324 may be coupled to the second bus 1320. Note that other architectures are possible. For example, instead of the point-to-point architecture of FIG. 13, a system may implement a multidrop bus or other such architecture.

Figure 14:
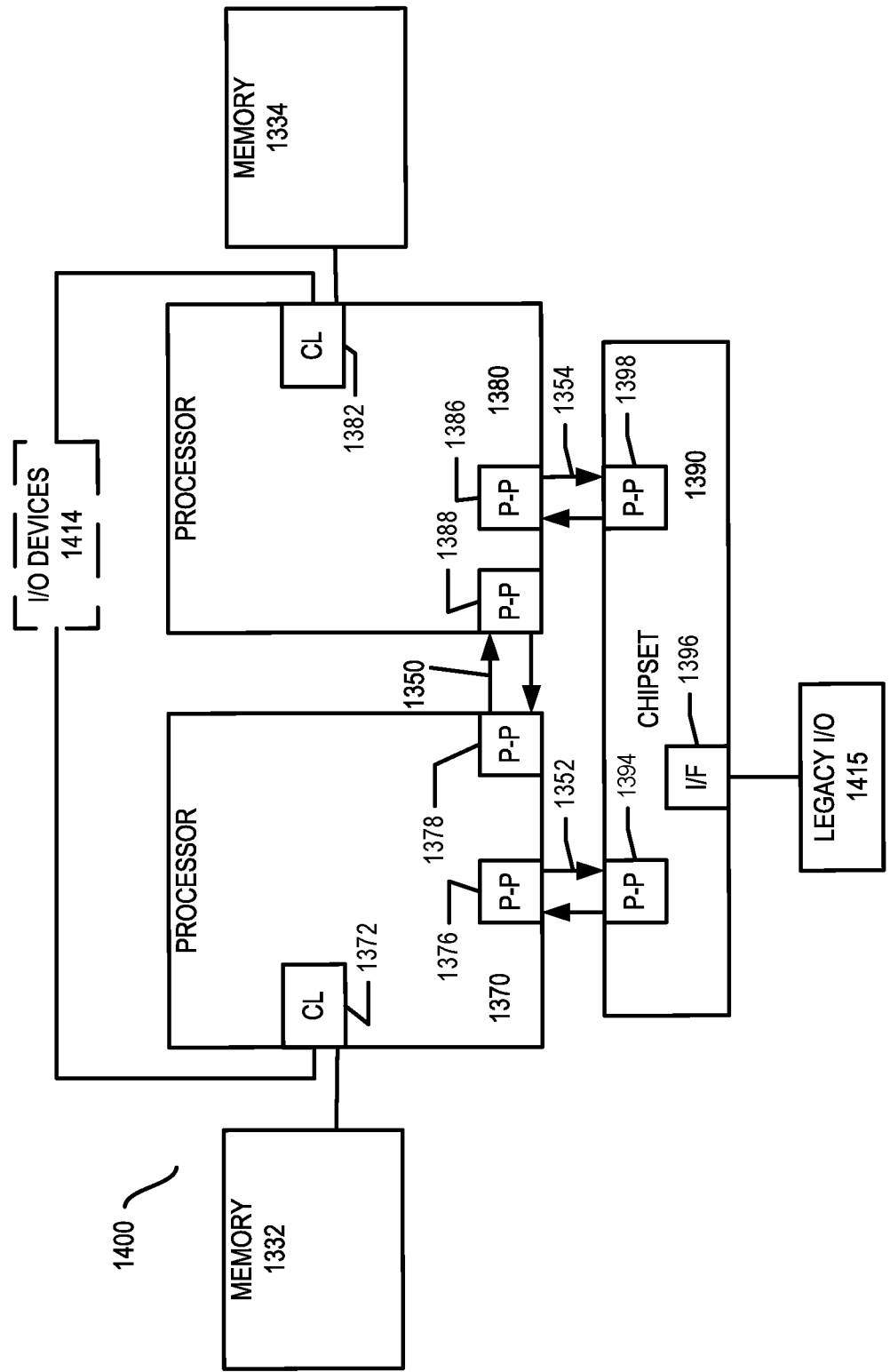

Referring now to FIG. 14, shown is a block diagram of a second more specific example system 1400. FIGS. 13 and 14 bear like reference numerals, and certain aspects of FIG. 13 have been omitted from FIG. 14 in order to avoid obscuring other aspects of FIG. 14.

FIG. 14 illustrates that the processors 1370, 1380 may include integrated memory and IO control logic ("CL") 1372 and 1382, respectively. Thus, the CL 1372, 1382 include integrated memory controller units and include IO control logic. FIG. 14 illustrates that not only are the memories 1332, 1334 coupled to the CL 1372, 1382, but also that IO devices 1414 are also coupled to the control logic 1372, 1382. Legacy IO devices 1415 are coupled to the chipset 1390.

Figure 15:
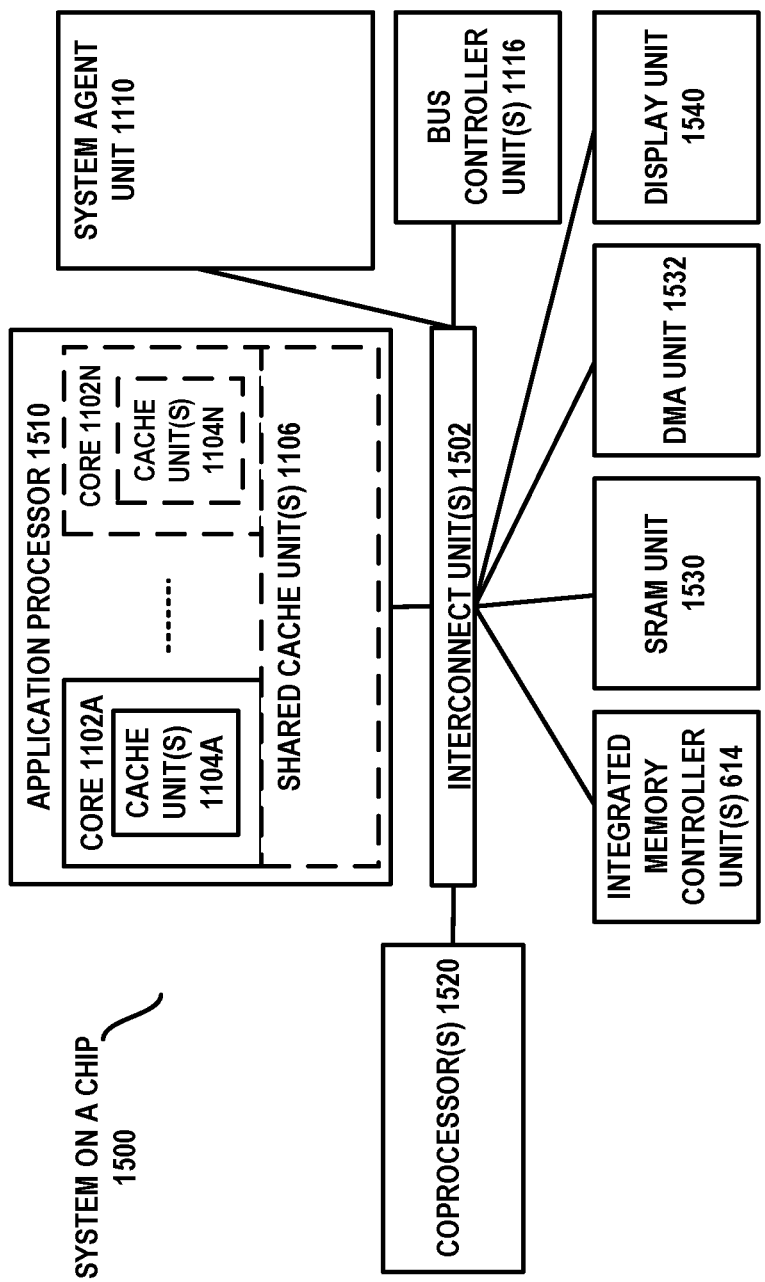

Referring now to FIG. 15, shown is a block diagram of a SoC 1500 in accordance with an embodiment. Similar elements in FIG. 10 bear like reference numerals. Also, dashed lined boxes are optional features on more advanced SoCs. In FIG. 10, an interconnect unit(s) 1502 is coupled to: an application processor 1510 which includes a set of one or more cores 1102A-N and shared cache unit(s) 1106; a system agent unit 1110; a bus controller unit(s) 1116; an integrated memory controller unit(s) 1114; a set of one or more coprocessors 1520 which may include integrated graphics logic, an image processor, an audio processor, and a video processor; a static random access memory (SRAM) unit 1530; a direct memory access (DMA) unit 1532; and a display unit 1540 for coupling to one or more external displays. In one embodiment, the coprocessor(s) 1520 includes a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Some embodiments may be implemented as computer programs or program code executing on programmable systems comprising at least one processor, a storage system (including volatile and nonvolatile memory and/or storage elements), at least one input device, and at least one output device.

Program code, such as code 1330 illustrated in FIG. 8, may be applied to input instructions to perform the functions described herein and generate output information. The output information may be applied to one or more output devices, in known fashion. For purposes of this application, a processing system includes any system that has a processor, such as, for example, a digital signal processor (DSP), a microcontroller, an application-specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, nontransitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, some embodiments also include nontransitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation or dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 16:
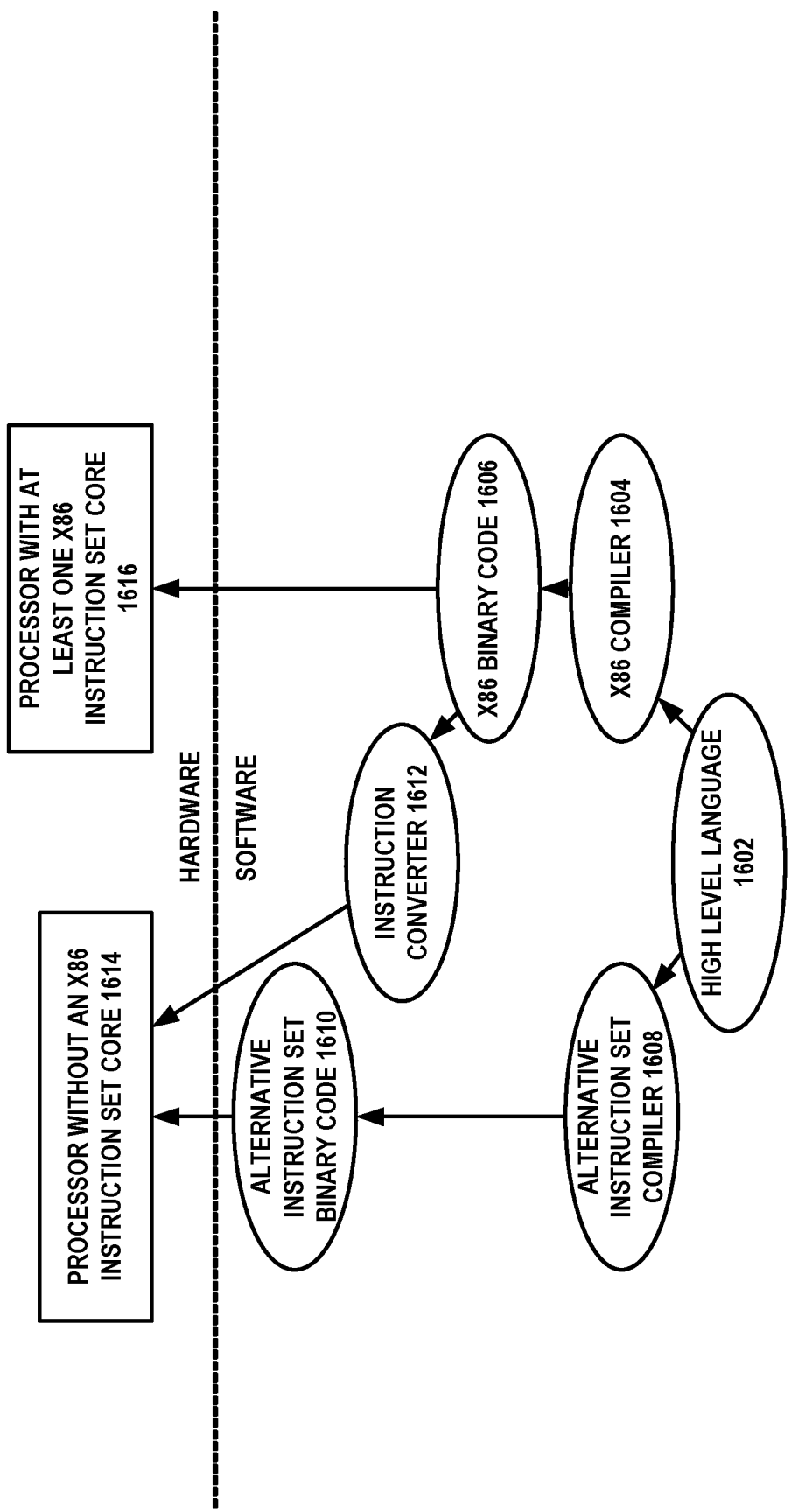
FIG. 16 is a block diagram contrasting the use of a software instruction converter to convert binary instructions in a source instruction set to binary instructions in a target instruction set according to one or more examples of the present specification.

FIG. 16 is a block diagram contrasting the use of a software instruction converter to convert binary instructions in a source instruction set to binary instructions in a target instruction set. In the illustrated embodiment, the instruction converter is a software instruction converter, although alternatively the instruction converter may be implemented in software, firmware, hardware, or various combinations thereof. FIG. 16 shows a program in a high level language 1602 may be compiled using an x86 compiler 1604 to generate x86 binary code 1606 that may be natively executed by a processor with at least one x86 instruction set core 1616. The processor with at least one x86 instruction set core 1616 represents any processor that can perform substantially the same functions as an Intel® processor with at least one x86 instruction set core by compatibly executing or otherwise processing (1) a substantial portion of the instruction set of the Intel® x86 instruction set core or (2) object code versions of applications or other software targeted to run on an Intel® processor with at least one x86 instruction set core, in order to achieve substantially the same result as an Intel® processor with at least one x86 instruction set core. The x86 compiler 1604 represents a compiler that is operable to generate x86 binary code 1606 (e.g., object code) that can, with or without additional linkage processing, be executed on the processor with at least one x86 instruction set core 1616. Similarly, FIG. 16 shows the program in the high level language 1602 may be compiled using an alternative instruction set compiler 1608 to generate alternative instruction set binary code 1610 that may be natively executed by a processor without at least one x86 instruction set core 1614 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1612 is used to convert the x86 binary code 1606 into code that may be natively executed by the processor without an x86 instruction set core 1614. This converted code is not likely to be the same as the alternative instruction set binary code 1610 because an instruction converter capable of this is difficult to make; however, the converted code will accomplish the general operation and be made up of instructions from the alternative instruction set. Thus, the instruction converter 1612 represents software, firmware, hardware, or a combination thereof that, through emulation, simulation or any other process, allows a processor or other electronic device that does not have an x86 instruction set processor or core to execute the x86 binary code 1606.

The foregoing outlines features of one or more embodiments of the subject matter disclosed herein. These embodiments are provided to enable a person having ordinary skill in the art (PHOSITA) to better understand various aspects of the present disclosure. Certain well-understood terms, as well as underlying technologies and/or standards may be referenced without being described in detail. It is anticipated that the PHOSITA will possess or have access to background knowledge or information in those technologies and standards sufficient to practice the teachings of the present specification.

The PHOSITA will appreciate that they may readily use the present disclosure as a basis for designing or modifying other processes, structures, or variations for carrying out the same purposes and/or achieving the same advantages of the embodiments introduced herein. The PHOSITA will also recognize that such equivalent constructions do not depart from the spirit and scope of the present disclosure, and that they may make various changes, substitutions, and alterations herein without departing from the spirit and scope of the present disclosure.

In the foregoing description, certain aspects of some or all embodiments are described in greater detail than is strictly necessary for practicing the appended claims. These details are provided by way of non-limiting example only, for the purpose of providing context and illustration of the disclosed embodiments. Such details should not be understood to be required, and should not be "read into" the claims as limitations. The phrase may refer to "an embodiment" or "embodiments." These phrases, and any other references to embodiments, should be understood broadly to refer to any combination of one or more embodiments. Furthermore, the several features disclosed in a particular "embodiment" could just as well be spread across multiple embodiments. For example, if features 1 and 2 are disclosed in "an embodiment," embodiment A may have feature 1 but lack feature 2, while embodiment B may have feature 2 but lack feature 1.

This specification may provide illustrations in a block diagram format, wherein certain features are disclosed in separate blocks. These should be understood broadly to disclose how various features interoperate, but are not intended to imply that those features must necessarily be embodied in separate hardware or software. Furthermore, where a single block discloses more than one feature in the same block, those features need not necessarily be embodied in the same hardware and/or software. For example, a computer "memory" could in some circumstances be distributed or mapped between multiple levels of cache or local memory, main memory, battery-backed volatile memory, and various forms of persistent memory such as a hard disk, storage server, optical disk, tape drive, or similar. In certain embodiments, some of the components may be omitted or consolidated. In a general sense, the arrangements depicted in the figures may be more logical in their representations, whereas a physical architecture may include various permutations, combinations, and/or hybrids of these elements. Countless possible design configurations can be used to achieve the operational objectives outlined herein. Accordingly, the associated infrastructure has a myriad of substitute arrangements, design choices, device possibilities, hardware configurations, software implementations, and equipment options.

References may be made herein to a computer-readable medium, which may be a tangible and non-transitory computer-readable medium. As used in this specification and throughout the claims, a "computer-readable medium" should be understood to include one or more computer-readable mediums of the same or different types. A computer-readable medium may include, by way of non-limiting example, an optical drive (e.g., CD/DVD/Blu-Ray), a hard drive, a solid-state drive, a flash memory, or other non-volatile medium. A computer-readable medium could also include a medium such as a read-only memory (ROM), an FPGA or ASIC configured to carry out the desired instructions, stored instructions for programming an FPGA or ASIC to carry out the desired instructions, an intellectual property (IP) block that can be integrated in hardware into other circuits, or instructions encoded directly into hardware or microcode on a processor such as a microprocessor, digital signal processor (DSP), microcontroller, or in any other suitable component, device, element, or object where appropriate and based on particular needs. A nontransitory storage medium herein is expressly intended to include any nontransitory special-purpose or programmable hardware configured to provide the disclosed operations, or to cause a processor to perform the disclosed operations.

Various elements may be "communicatively," "electrically," "mechanically," or otherwise "coupled" to one another throughout this specification and the claims. Such coupling may be a direct, point-to-point coupling, or may include intermediary devices. For example, two devices may be communicatively coupled to one another via a controller that facilitates the communication. Devices may be electrically coupled to one another via intermediary devices such as signal boosters, voltage dividers, or buffers. Mechanically-coupled devices may be indirectly mechanically coupled.

Any "module" or "engine" disclosed herein may refer to or include software, a software stack, a combination of hardware, firmware, and/or software, a circuit configured to carry out the function of the engine or module, or any computer-readable medium as disclosed above. Such modules or engines may, in appropriate circumstances, be provided on or in conjunction with a hardware platform, which may include hardware compute resources such as a processor, memory, storage, interconnects, networks and network interfaces, accelerators, or other suitable hardware. Such a hardware platform may be provided as a single monolithic device (e.g., in a PC form factor), or with some or part of the function being distributed (e.g., a "composite node" in a high-end data center, where compute, memory, storage, and other resources may be dynamically allocated and need not be local to one another).

There may be disclosed herein flow charts, signal flow diagram, or other illustrations showing operations being performed in a particular order. Unless otherwise expressly noted, or unless required in a particular context, the order should be understood to be a non-limiting example only. Furthermore, in cases where one operation is shown to follow another, other intervening operations may also occur, which may be related or unrelated. Some operations may also be performed simultaneously or in parallel. In cases where an operation is said to be "based on" or "according to" another item or operation, this should be understood to imply that the operation is based at least partly on or according at least partly to the other item or operation. This should not be construed to imply that the operation is based solely or exclusively on, or solely or exclusively according to the item or operation.

All or part of any hardware element disclosed herein may readily be provided in a system-on-a-chip (SoC), including a central processing unit (CPU) package. An SoC represents an integrated circuit (IC) that integrates components of a computer or other electronic system into a single chip. Thus, for example, client devices or server devices may be provided, in whole or in part, in an SoC. The SoC may contain digital, analog, mixed-signal, and radio frequency functions, all of which may be provided on a single chip substrate. Other embodiments may include a multichip module (MCM), with a plurality of chips located within a single electronic package and configured to interact closely with each other through the electronic package.

In a general sense, any suitably-configured circuit or processor can execute any type of instructions associated with the data to achieve the operations detailed herein. Any processor disclosed herein could transform an element or an article (for example, data) from one state or thing to another state or thing. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein, should be construed as being encompassed within the broad terms "memory" and "storage," as appropriate.

Computer program logic implementing all or part of the functionality described herein is embodied in various forms, including, but in no way limited to, a source code form, a computer executable form, machine instructions or microcode, programmable hardware, and various intermediate forms (for example, forms generated by an assembler, compiler, linker, or locator). In an example, source code includes a series of computer program instructions implemented in various programming languages, such as an object code, an assembly language, or a high-level language such as OpenCL, FORTRAN, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example embodiment, any number of electrical circuits of the FIGURES may be implemented on a board of an associated electronic device. The board can be a general circuit board that can hold various components of the internal electronic system of the electronic device and, further, provide connectors for other peripherals. Any suitable processor and memory can be suitably coupled to the board based on particular configuration needs, processing demands, and computing designs. Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification.

Numerous other changes, substitutions, variations, alterations, and modifications may be ascertained to one skilled in the art and it is intended that the present disclosure encompass all such changes, substitutions, variations, alterations, and modifications as falling within the scope of the appended claims.

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 (pre-AIA) or paragraph (f) of the same section (post-AIA), as it exists on the date of the filing hereof unless the words "means for" or "steps for" are specifically used in the particular claims; and (b) does not intend, by any statement in the specification, to limit this disclosure in any way that is not otherwise expressly reflected in the appended claims.

Example Implementations

There is disclosed an example of a microprocessor, comprising: a processing core; and a total memory encryption (TME) engine to provide TME for a first trust domain (TD), and further to: allocate a block of physical memory to the first TD and a first cryptographic key to the first TD; map within an extended page table (EPT) a host physical address (HPA) space to a guest physical address (GPA) space of the TD; create a memory ownership table (MOT) entry for a memory page within the block of physical memory, wherein the MOT table comprises a GPA reverse mapping; encrypt the MOT entry using the first cryptographic key; and append to the MOT entry verification data, wherein the MOT entry verification data enables detection of an attack on the MOT entry.

There is further disclosed an example of a microprocessor, wherein the processor, responsive to one or more instructions, is to provision the MOT in a memory range controlled by a physical memory range register.

There is further disclosed an example of a microprocessor, wherein the TME engine is a multi-key TME engine, wherein the first cryptographic key provides a first key domain, and wherein the TME engine is further to allocate a second TD with a second key domain.

There is further disclosed an example of a microprocessor, wherein the MOT further comprises a TD control structure (TDCS) pointer field.

There is further disclosed an example of a microprocessor, wherein the entry verification data comprises a version number field.

There is further disclosed an example of a microprocessor, wherein the entry verification data comprises an integrity field.

There is further disclosed an example of a microprocessor, wherein the integrity field comprises a cryptographic hash of the MOT entry signed by the first encryption key.

There is further disclosed an example of a microprocessor, wherein the MOT entry is a 128-bit hash.

There is further disclosed an example of a microprocessor, wherein the MOT entry is divided into 128-bit lines.

There is further disclosed an example of a microprocessor, wherein the TME is configured to encrypt memory at a cache line granularity.

There is further disclosed an example of a microprocessor, wherein the MOT is configured to divide cache operations into 128-bit aligned blocks.

There is further disclosed an example of a microprocessor, wherein the processor further comprises a page miss handler (PMH) configured to walk a memory page on a page miss, to determine that an integrity check based on the entry verification data has failed, and to invalidate the memory page.

There is further disclosed an example of a microprocessor, wherein the PMH is further to signal a TD exit for the first TD.

There is also disclosed an example of a computing apparatus comprising a memory and the microprocessor.

There is further disclosed an example of a computing apparatus, further comprising a virtual machine manager (VMM), wherein the TME engine is configured to isolate the first TD from the VMM.

There is also disclosed an example of one or more tangible, non-transitory mediums having stored thereon instructions for providing total memory encryption (TME) for a trust domain (TD), comprising instructions to: allocate a block of physical memory to the first TD and a first cryptographic key to the first TD; map within an extended page table (EPT) a host physical address (HPA) space to a guest physical address (GPA) space of the TD; create a memory ownership table (MOT) entry for a memory page within the block of physical memory, wherein the MOT table comprises a GPA reverse mapping; encrypt the MOT entry using the first cryptographic key; and append to the MOT entry verification data, wherein the MOT entry verification data enables detection of an attack on the MOT entry.

There is further disclosed an example of one or more tangible, non-transitory mediums, wherein the first cryptographic key provides a first key domain, and wherein the instructions are further to allocate a second TD with a second key domain.

There is further disclosed an example of one or more tangible, non-transitory mediums, wherein the MOT further comprises a TD control structure (TDCS) pointer field.

There is further disclosed an example of one or more tangible, non-transitory mediums, wherein the entry verification data comprises an integrity field.

There is further disclosed an example of one or more tangible, non-transitory mediums, wherein the entry verification data comprises a version number field.

There is further disclosed an example of one or more tangible, non-transitory mediums, wherein the integrity field comprises a cryptographic hash of the MOT entry signed by the first encryption key.

There is further disclosed an example of one or more tangible, non-transitory mediums, wherein the MOT entry is a 128-bit hash.

There is further disclosed an example of one or more tangible, non-transitory mediums, wherein the MOT entry is divided into 128-bit lines.

There is further disclosed an example of one or more tangible, non-transitory mediums, further comprising encrypting memory at a cache line granularity.

There is further disclosed an example of one or more tangible, non-transitory mediums, further comprising dividing cache operations into 128-bit aligned blocks.

There is further disclosed an example of one or more tangible, non-transitory mediums, further comprising walking a memory page on a page miss, determining that an integrity check based on the entry verification data has failed, and invalidating the memory page.

There is further disclosed an example of one or more tangible, non-transitory mediums, further comprising signaling a TD exit for the first TD.

There is also disclosed a computer-implemented method of providing total memory encryption (TME) for a trust domain (TD), comprising: allocating a block of physical memory to the first TD and a first cryptographic key to the first TD; mapping within an extended page table (EPT) a host physical address (HPA) space to a guest physical address (GPA) space of the TD; creating a memory ownership table (MOT) entry for a memory page within the block of physical memory, wherein the MOT table comprises a GPA reverse mapping; encrypting the MOT entry using the first cryptographic key; and appending to the MOT entry verification data, wherein the MOT entry verification data enables detection of an attack on the MOT entry.

There is further disclosed a method, wherein the first cryptographic key provides a first key domain, further comprising allocating a second TD with a second key domain.

There is further disclosed a method, wherein the MOT further comprises a TD control structure (TDCS) pointer field.

There is further disclosed a method, wherein the entry verification data comprises an integrity field.

There is further disclosed a method, wherein the entry verification data comprises a version number field.

There is further disclosed a method, wherein the integrity field comprises a cryptographic hash of the MOT entry signed by the first encryption key.

There is further disclosed a method, wherein the MOT entry is a 128-bit hash.

There is further disclosed a method, wherein the MOT entry is divided into 128-bit lines.

There is further disclosed a method, further comprising encrypting memory at a cache line granularity.

There is further disclosed a method, further comprising dividing cache operations into 128-bit aligned blocks.

There is further disclosed a method, further comprising walking a memory page on a page miss, determining that an integrity check based on the entry verification data has failed, and invalidating the memory page.

There is further disclosed a method, further comprising signaling a TD exit for the first TD.

There is further disclosed an apparatus comprising means for performing the method of one or more examples of the present specification.

There is further disclosed an apparatus, wherein the means for performing the method comprise a processor and a memory.

There is further disclosed an apparatus, wherein the memory comprises machine-readable instructions, that when executed cause the apparatus to perform the method of one or more examples of the present specification.

There is further disclosed an apparatus, wherein the apparatus is a computing system.

There is further disclosed at least one computer readable medium comprising instructions that, when executed, implement a method or realize an apparatus as claimed in one or more examples of the present specification.

A computing apparatus, comprising: a hardware platform; and total memory encryption (TME) means to provide TME for a first trust domain (TD), and further to: allocate a block of memory to the first TD and a first cryptographic key to the first TD; map within an extended page table (EPT) a first physical address space to a second physical address space of the TD; create a memory ownership table (MOT) entry for a memory page within the block of memory, wherein the MOT table comprises a second physical address space to first physical address space reverse mapping; encrypt the MOT entry using the first cryptographic key; and append to the MOT entry verification data, wherein the MOT entry verification data enables detection of an attack on the MOT entry.

There is further described an example, wherein the hardware platform comprises processing means, the processing means, responsive to one or more instructions, is to provision the MOT in a memory range controlled by a physical memory range register.

There is further described an example, wherein the TME means comprise a multi-key TME engine, wherein the first cryptographic key provides a first key domain, and wherein the TME means are further to allocate a second TD with a second key domain.

There is further described an example, wherein the MOT further comprises a TD control structure (TDCS) pointer field.

There is further described an example, wherein the entry verification data comprises an integrity field.

There is further described an example, wherein the entry verification data comprises a version number field.

There is further described an example, wherein the integrity field comprises a cryptographic hash of the MOT entry signed by the first encryption key.

There is further described an example, wherein the MOT entry is a 128-bit hash.

There is further described an example, wherein the MOT entry is divided into 128-bit lines.

There is further described an example, wherein the TME is configured to encrypt memory at a cache line granularity.

There is further described an example, wherein the MOT is configured to divide cache operations into 128-bit aligned blocks.

There is further described an example, wherein the processing means further comprises a page miss handler (PMH) configured to walk a memory page on a page miss, to determine that an integrity check based on the entry verification data has failed, and to invalidate the memory page.

There is further described an example, wherein the PMH is further to signal a TD exit for the first TD.

There is further described an example of a computing apparatus comprising a memory and the hardware platform of any preceding example.

There is further described an example, further comprising a virtual machine manager (VMM), wherein the TME means are configured to isolate the first TD from the VMM.

What is claimed is:

1. A microprocessor, comprising:
   a processing core; and
   a total memory encryption (TME) engine to provide TME for a first trust domain (TD), and further to:
   allocate a block of physical memory to the first TD and a first cryptographic key to the first TD;
   map within an extended page table (EPT) a host physical address (HPA) space to a guest physical address (GPA) space of the TD;
   create, in a memory ownership table (MOT), a MOT entry for a memory page within the block of physical memory, wherein the MOT comprises a reverse mapping from the GPA space to the HPA space;
   encrypt the MOT entry using the first cryptographic key; and
   append verification data to the MOT entry, wherein the verification data enables detection of an attack on the MOT entry.

2. The microprocessor of claim 1, wherein the processing core, responsive to one or more instructions, is to provision the MOT in a memory range controlled by a physical memory range register.

3. The microprocessor of claim 1, wherein the TME engine is a multi-key TME engine, wherein the first cryptographic key provides a first key domain, and wherein the TME engine is further to allocate a second TD with a second key domain.

4. The microprocessor of claim 1, wherein the MOT further comprises a TD control structure (TDCS) pointer field.

5. The microprocessor of claim 1, wherein the verification data comprises a version number field.

6. The microprocessor of claim 1 wherein the verification data comprises an integrity field.

7. The microprocessor of claim 6, wherein the integrity field comprises a cryptographic hash of the MOT entry signed by an encryption key.

8. The microprocessor of claim 7, wherein the MOT entry is a 128-bit hash.

9. The microprocessor of claim 7, wherein the MOT entry is divided into 128-bit lines.

10. The microprocessor of claim 1, wherein the TME is configured to encrypt memory at a cache line granularity.

11. The microprocessor of claim 10, wherein the MOT is configured to divide cache operations into 128-bit aligned blocks.

12. The microprocessor of claim 1, further comprising a page miss handler (PMH) configured to walk a memory page on a page miss, to determine that an integrity check based on the verification data has failed, and to invalidate the memory page.

13. The microprocessor of claim 12, wherein the PMH is further to signal a TD exit for the first TD.

14. A computing apparatus comprising a memory and the microprocessor of claim 1.

15. The computing apparatus of claim 14, further comprising a virtual machine manager (VMM), wherein the TME engine is configured to isolate the first TD from the VMM.

16. One or more tangible, non-transitory mediums having stored thereon instructions for providing total memory encryption (TME) for a trust domain (TD), comprising instructions to:
   allocate a block of physical memory to the first TD and a first cryptographic key to the first TD;
   map within an extended page table (EPT) a host physical address (HPA) space to a guest physical address (GPA) space of the TD;
   create, in a memory ownership table (MOT), a MOT entry for a memory page within the block of physical memory, wherein the MOT comprises a GPA reverse mapping from the GPA space to the HPA space;
   encrypt the MOT entry using the first cryptographic key; and
   append verification data to the MOT entry, wherein the verification data enables detection of an attack on the MOT entry.

17. The one or more tangible, non-transitory mediums of claim 16, wherein the first cryptographic key provides a first key domain, and wherein the instructions are further to allocate a second TD with a second key domain.

18. The one or more tangible, non-transitory mediums of claim 16, wherein the MOT further comprises a TD control structure (TDCS) pointer field.

19. The one or more tangible, non-transitory mediums of claim 16, wherein the verification data comprises an integrity field.

20. The one or more tangible, non-transitory mediums of claim 16, wherein the verification data comprises a version number field.

21. The one or more tangible, non-transitory mediums of claim 20, wherein the integrity field comprises a cryptographic hash of the MOT entry signed by an encryption key.

22. The one or more tangible, non-transitory mediums of claim 21, wherein the MOT entry is a 128-bit hash.

23. The one or more tangible, non-transitory mediums of claim 21, wherein the MOT entry is divided into 128-bit lines.

24. The one or more tangible, non-transitory mediums of claim 16, wherein the instructions are to encrypt memory at a cache line granularity.

25. The one or more tangible, non-transitory mediums of claim 16, wherein the instructions are to divide cache operations into 128-bit aligned blocks.

* * * * *